United States Patent [19]
Redmond et al.

[11] Patent Number: 5,913,955
[45] Date of Patent: Jun. 22, 1999

[54] VIBRATION DAMPING METHOD AND APPARATUS

[75] Inventors: James M. Redmond; Patrick S. Barney, both of Albuquerque, N.M.; Gordon G. Parker, Hougton, Mich.; David A. Smith, Gainesville, Fla.

[73] Assignee: Sandia Corporation, Albuquerque, N.M.

[21] Appl. No.: 09/022,729

[22] Filed: Feb. 12, 1998

[51] Int. Cl.$^6$ .................................. B23B 3/00; B23B 5/00
[52] U.S. Cl. .................................. 82/1.11; 82/163; 82/904; 82/905; 408/17; 408/143; 409/141
[58] Field of Search .............................. 82/163, 1.11, 903, 82/904, 905; 408/17, 153; 409/141

[56] References Cited

U.S. PATENT DOCUMENTS

| | | | |
|---|---|---|---|
| 3,207,009 | 9/1965 | Carlstedt | 82/904 |
| 3,466,970 | 9/1969 | Jones | 82/173 |
| 3,642,378 | 2/1972 | Haln et al. | 408/143 |
| 5,170,103 | 12/1992 | Rouch et al. | 318/128 |
| 5,558,477 | 9/1996 | Browning et al. | 408/143 |
| 5,810,528 | 9/1998 | O'Connor et al. | 409/141 |

OTHER PUBLICATIONS

Sanjiv G. Tewani, *A Study of Cutting Process Stability of a Boring Bar with Active Dynamic Absorber*, Int. J. Mach. Tools Manufacturing, 35, No. 1, pp. 91–108, 1995.

Sanjiv G. Tewani, *Active Control of Machine Tool Chatter for a Boring Bar: Experimental Results*, DE–vol. 61, Vibration and Control of Mechanical Systems, ASME 1993.

K. J.Kim, *Suppression of Machine Tool Chatter Using a Viscoelastic Dynamic Damper*, Journal of Engineering for Industry, vol. 109 pp. 58–65, Feb., 1987.

Redmond, et al, *Development and Testing of an Active Boring Bar for Increased Chatter Immunity*, Sandia Report SAND97–2860, UC–1420, Nov. 1997.

Barney, et al., *Characteristics of Self–Sensing Actuation for Active Control*, Proceedings of the International Model Analysis Conference–XV, Orlando, FL, 1997, pp. 739–744.

Redmond, et al, *Active Vibration Control of a Photolithography Platen for Increased Resolution and Throughput*, AIAA SD Conference, Salt Lake City, Utah, Apr. 1996.

*Primary Examiner*—Andrea L. Pitts
*Assistant Examiner*—Toan Le
*Attorney, Agent, or Firm*—V. Gerald Grafe

[57] ABSTRACT

The present invention provides vibration damping method and apparatus that can damp vibration in more than one direction without requiring disassembly, that can accommodate varying tool dimensions without requiring re-tuning, and that does not interfere with tool tip operations and cooling. The present invention provides active dampening by generating bending moments internal to a structure such as a boring bar to dampen vibration thereof.

17 Claims, 33 Drawing Sheets

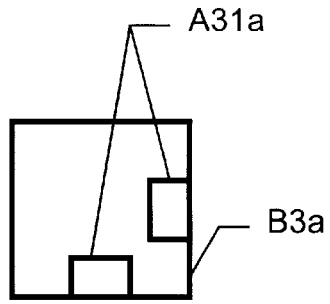
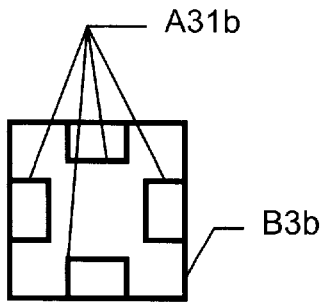
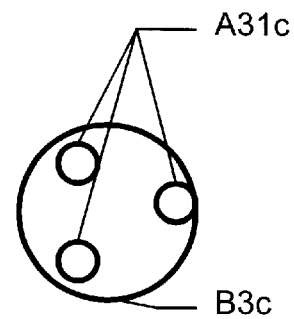
Figure 3a　　　　　Figure 3b　　　　　Figure 3c
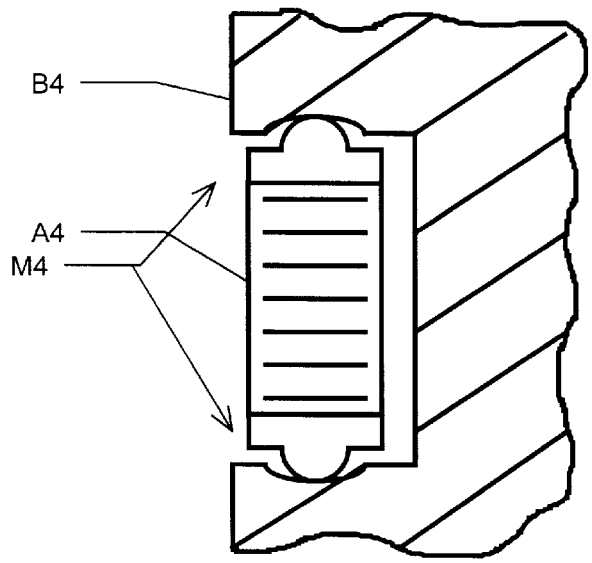
Figure 4

VIBRATION DAMPING METHOD AND APPARATUS

This invention was made with Government support under Contract DE-AC04-94AL85000 awarded by the U. S. Department of Energy. The Government has certain rights in the invention.

BACKGROUND OF THE INVENTION

This invention relates to the field of vibration damping, specifically using extensional actuators for active vibration damping of relatively stiff structures such as boring bars.

In many metal cutting processes, the metal removal rate (MRR) is limited by the phenomenon of chatter, a regenerative vibration that is driven by workpiece surface undulations resulting from previous tool vibrations. Because resistance to chatter in the absence of workpiece flexibility is a function of the damping inherent to the tool structure, in many cases the use of feedback control to stabilize the primary modes of vibration should permit substantially higher metal removal rates.

Assuming a rigid workpiece, the precision that can be achieved in a metal cutting process such as a boring operation is determined by the static stiffness of the boring bar. Furthermore, the process stability is governed in large part by the bar's dynamic stiffness, which can be thought of as a combination of the static stiffness and the bar's inherent structural damping. Consequently, from both a precision and a stability viewpoint, it is desirable to use the stoutest tool available for a given operation. Many boring applications, however, necessitate the use of boring bars with high overhang ratios (L/D) for which it is difficult to achieve stability in the cutting process due to the inherent flexibility of the tool.

Since a tool's resistance to chatter vibrations is heavily dependent on the damping in the boring bar structure, numerous attempts to augment the bar damping by both active and passive means have been described. Most effective when placed in regions of high displacement near the bar tip, these devices commonly provide vibration suppression in only one direction, typically normal or tangential to the workpiece surface. Furthermore, complications associated with cutting zone interference and coolant application make these approaches cumbersome in practice.

Passive tuned mass dampers have been proven to be effective vibration dampers. See, e.g., Herzog, "Active Versus Passive Vibration Absorbers," Journal of Dynamic Systems, Measurement, and Control, Vol. 116, September 1994, PP 367–371; Cobb, "Design of Dampers for Boring Bars and Spindle Extensions," Master's Thesis, University of Florida, Gainesville, Fla, 1989. Passive tuned mass dampers suffer from two major drawbacks. First, the passive tuned damper is most effective when placed near the boring bar tip, exposing it to the caustic cooling fluids and possibly causing it to interfere with the cutting process. Secondly, to be effective, the passive tuned damper must be tuned to match the chatter frequency of the boring bar. However, the effective length of the boring bar is regularly altered during and between boring processes, and the passive tuned damper must be re-tuned to match the current frequency.

The limitations of passive tuned dampers can be circumvented by boring bars featuring nonlinear passive impact dampers. See, e.g., Fitzgerald, "A Comparative Study of the Lanchester Damper and the Segmented Slug Damper in Boring Applications," ASME Paper 81-Det-90, Sep. 20–23, 1981; "Kennametal Lathe Tooling," Catalog 4000, Kennametal Inc., Latrobe, Pa., 15650, p. 388. In these boring bars, a hollowed out section of the boring bar is filled with masses that dissipate vibrational energy through impact.

More recently, active tuned mass dampers have been mounted at the interior of the tool tip, avoiding the problems of interference with the cutting zone. Tewani et al., "Active Control of Machine Tool Chatter for a Boring Bar: Experimental Results," DE-Vol. 61, Vibration and Control of Mechanical Systems, ASME 1993, pp. 103–115. Electronic tuning of these dampers is more practical than the mechanical tuning of their passive counterparts, but the fundamental frequency of the bar must still be determined prior to initiating a cut. In addition, the internal geometry of the boring bar limits the size of the damper, making it inappropriate for many applications. Further, changing boundary conditions during a cut can shift the fundamental frequency and consequently reduce the effectiveness of the tuned damper.

Kennametal's recently introduced 'Tuned Tooling' product line featuring internally mounted electronically tuned passive dampers overcomes many of the problems of conventional passive dampers. These devices augment cutting stability by suppressing the tool vibration at the first bending mode frequency, which is determined by a pre-cut impact test. But because frequencies tend to shift during cut, it is suspected that the effectiveness of this approach will be limited, though no field data is yet available.

In a project related to the Kennametal tuned tooling development, a boring bar featuring an active damper for increased functionality was developed under DARPA funding by a team led by Lucent Technologies. They developed an adaptive control circuit for their internal damper, producing impressive results in a floor demonstration. Test results indicated that the cutting conditions greatly impacted the tool performance, with some conditions favoring a damper orientation normal to the workpiece surface while others favored a tangential orientation. Thus, changing materials or cutting conditions can require removal and disassembly of the cutting head to properly orient the damper. This limitation is not problematic in a high production facility where a single set-up may be used to machine thousands of identical parts. But a more robust solution applicable to a wide range of cutting conditions was desired. Consequently, the Lucent team also produced an active tool holder capable of damping tool vibrations in two directions simultaneously. Good performance was demonstrated for a range of cutting conditions on different materials. The difficulty in designing a generic interface that enables the active clamp to be mounted to different machines limits the applicability of this approach.

Accordingly, there is a need for a vibration damping method and apparatus that can extend to damp vibration in more than one direction without requiring disassembly, that can readily accommodate varying tool dimensions, that does not interfere with tool tip operations and cooling, and that doesn't require custom interfacing.

SUMMARY OF THE INVENTION

The present invention provides vibration damping method and apparatus that can damp vibration in more than one direction without requiring disassembly, that can accommodate varying tool dimensions without requiring re-tuning, and that does not interfere with tool tip operations and cooling. The present invention comprises means for generating bending moments internal to a structure such as a boring bar to dampen vibration thereof.

A method of damping vibration according to the present invention comprises mounting an extensional actuator with a structure. The actuator can be mounted so that activation of the actuator produces a bending moment internal to the structure. A control system can activate the actuator to counter forces acting on the structure. The control system can sense a force acting on the structure, or can sense acceleration or displacement of a portion of the structure. The actuator can be mounted, for example, in a recess formed in the structure. Suitable actuators include piezoelectric stack actuators, magnetostrictive actuators, electrostrictive actuators, and hydraulic actuators.

A boring bar with active vibration control according to the present invention can comprise a bar with means for generating internal moments. The moment means can comprise an actuator mounted with the bar, for example in a recess formed near the root end of the bar. Sensors can provide information to determine the magnitude of the internal moment required to damp vibration. Self-sensing actuators can be used, as can direct force sensors, accelerometers, and displacement sensors. Multiple actuators can be mounted with the bar to provide vibration damping in more than one axis.

Advantages and novel features will become apparent to those skilled in the art upon examination of the following description or may be learned by practice of the invention. The objects and advantages of the invention may be realized and attained by means of the instrumentalities and combinations particularly pointed out in the appended claims.

DESCRIPTION OF THE FIGURES

The accompanying drawings, which are incorporated into and form part of the specification, illustrate embodiments of the invention and, together with the description, serve to explain the principles of the invention.

FIG. 3a–3c shows arrangements of actuators suitable for use with the present invention.

FIG. 4 is an illustration of an actuator.

DETAILED DESCRIPTION OF THE INVENTION

The present invention provides vibration damping method and apparatus that can damp vibration in more than one direction without requiring disassembly, that can accommodate varying tool dimensions without requiring re-tuning, and that does not interfere with tool tip operations and cooling. The present invention comprises means for generating bending moments internal to a structure, such as a boring bar, to dampen vibration thereof. Structures according to the present invention generate internal bending moments to counter forces generated during a machining process. The internal bending moments provide control over the structure that can be used to actively damp vibration thereof. The present invention is applicable to a wide range of stiff structures, particularly stiff structures used as tools or tool supports in machining operations. Examples of boring bars (stiff structures used as a cutting tool support in boring operations) according to present invention are described in "Development and Testing of an Active Boring Bar for Increased Chatter Immunity," Redmond et al., Sandia Report SAND97-2860, incorporated herein by reference.

Active vibration damping according to the present invention circumvents many of the difficulties posed by conventional vibration absorbers by employing strain based actuators such as piezoelectric or magnetostrictive actuators. Because these actuators are most effective in regions of high strain, they can be placed near the bar root, eliminating the potential for cutting zone interference. Mounted in recesses cut into the bar surface, these actuators can induce bending moments in the boring bar through extensional motion. Information from a root strain gage, tip mounted accelerometer, or self-sensing from the actuators can be used as a feedback signal which is filtered by a control algorithm. By setting the controller parameters to effect an increase in bar damping, the closed loop system increases the bar's immunity against chatter vibrations.

Figure 1:
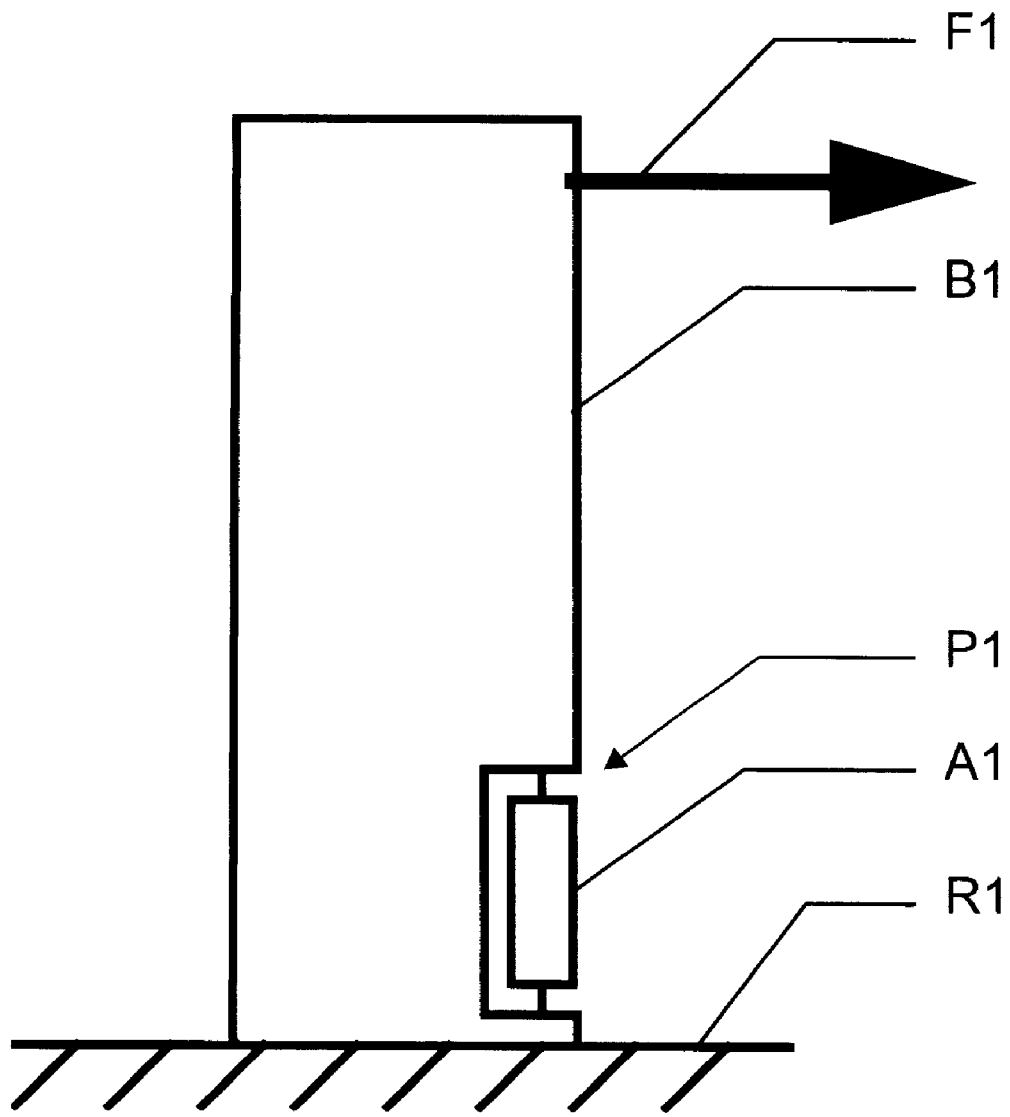
FIG. 1 is a sectional view of a structure with vibration suppression according to the present invention.

FIG. 1 is a sectional view of a structure with vibration suppression according to the present invention. A bar B1 mounts with a rigid structure R1 such as a machine tool chuck. The end of bar B1 near rigid structure R1 is often called the root end. Force F1, such as those generated by cutting with the end of bar B1 distal from the root end, acts to deflect bar B1. In some cutting operations, force F1 can lead to vibration commonly called chatter, reducing the performance of the tool. An actuator A1 mounts in recess P1 formed near the root end of bar B1. Extensional motion of actuator A1 generates an internal bending moment in bar B1. A control system (not shown) can use information from sensors (not shown) to determine a force required from actuator A1 to counteract vibration resulting from force F1 acting on bar B1 during a cutting or other operation.

Figure 2:
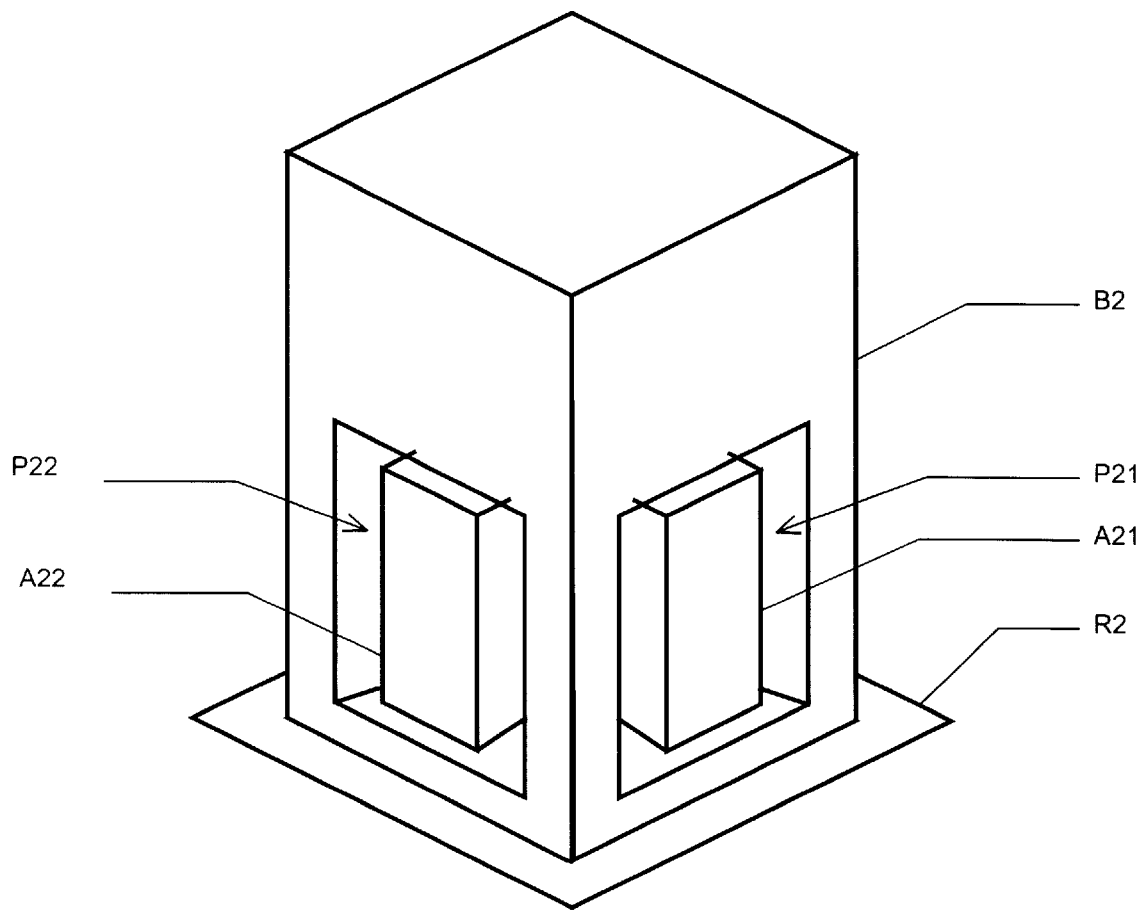
FIG. 2 is an isometric view of a structure with vibration suppression according to the present invention.

FIG. 2 is an isometric view of a structure with vibration suppression according to the present invention. Bar B2 mounts near its root end with a rigid structure R2. Actuators A21, A22 mount with bar B2 in recesses P21, P22 formed therein. Recesses P21, P22 are located substantially 90 degrees apart in azimuth. Actuators A21, A22 can expand and contract longitudinally to generate bending moments internal to bar B2. The combination of actuators A21, A22 provide control authority over multiple axes, allowing a control system (not shown) to damp vibration in several axes.

FIG. 3 shows arrangements of actuators suitable for use with the present invention. FIG. 3a shows a cross section of a bar B3a with two actuators A31a, 90 degrees apart in azimuth, as discussed in FIG. 2. FIG. 3b shows a cross section of a bar B3b with 4 actuators A31b, arranged at 90 degree intervals. The actuators can be controlled as bi-morph pairs, providing greater actuation force. FIG. 3c shows a cross section of a bar B3c with three actuators A31c, separated by 120 degrees in azimuth. Those skilled in the art will appreciate other numbers and arrangements of actuators and suitable control systems.

Actuators

Generating internal bending moments into relatively stiff structures such as boring bars can require greater control authority than is available from conventional surface mounted $d_{31}$ actuators such as Lead-Zirconate-Titanate (PZT) patches of Polyvinylidene Fluoride (PVDF) film. The increased force capabilities of $d_{33}$ PZT stack actuators can be used to provide the needed control authority. FIG. 4 shows a PZT stack actuator A4 and mounting M4 suitable for use with the present invention. Placed in recesses in structure B4, actuator A4 can generate moments in structure B4 via a two point pre-loaded mounting scheme M4. Mountings such as that shown in FIG. 4 can minimize the transmission of bending stresses from bar B4 to actuator A4, important with relatively fragile PZT stack actuators.

Sensors

Figure 5:
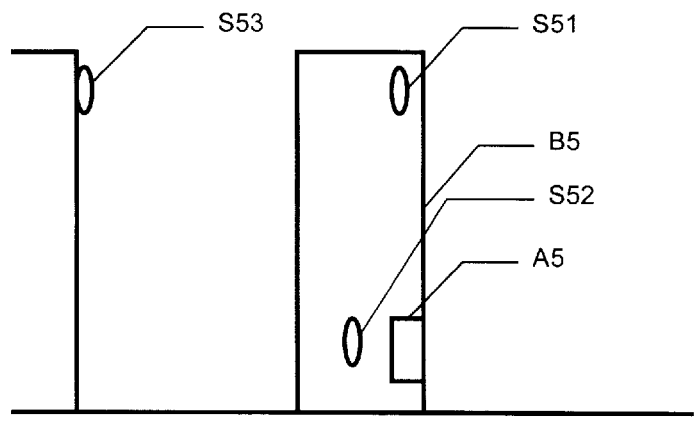
FIG. 5 is an illustration of sensor placement.

Sensors for use in controlling actuators can be of various types. FIG. 5 shows several example placements of sensors. For example, accelerometer S51 mounted with the distal end of a bar B5 can provide information useable by a control system. Other examples include a strain gauge S52 mounted with the root end of bar B5, self-sensing actuator A5, and external displacement sensor S53. (a specific embodiment of the present invention will not necessarily use all the placements shown in FIG. 5). Another example is a velocity sensor for sensing the velocity of a portion of a structure. Self-sensing actuators are also discussed in "Characteristics of Self-Sensing Actuation for Active Control," Bamey et al., Proceedings of the International Modal Analysis Conference-XV, Orlando, Fla., 1997, pp. 739–744, incorporated herein by reference.

Control System

Figure 6:
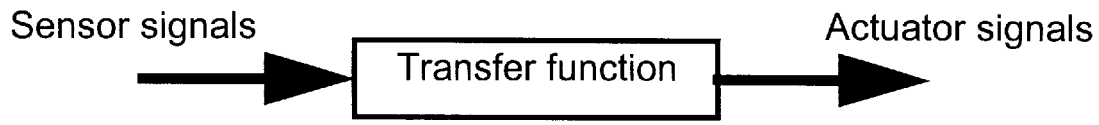
FIG. 6 is a flow diagram of a control system suitable for use with the present invention.

A control system for use with the present invention comprises a transfer function that filters sensor signals and provides activation signals to actuators that increase damping in appropriate modes. FIG. 6 illustrates an example control system. Similar control systems are discussed in "Active Vibration Control of a Photolithography Platen for Increased Resolution and Throughput," Redmond et al., AIAA SDM Conference, Salt Lake City, Utah, April 1996, incorporated herein by reference.

First Example Boring Bar

Vibration suppression according to the present invention was demonstrated in a first example boring bar. The first example boring bar was equipped with sensors and actuators for two-axis active damping. Four PZT stack actuators were mounted at ninety degree intervals around the root of a commercially available two inch diameter boring bar. Opposite actuators were grouped in bi-morph pairs to provide differential inputs for controlling bending vibration. Numerous benchtop experiments were conducted, and models of the open and closed loop systems were extracted for use in a boring process simulation. Results of the testing and analysis indicated that there exists sufficient control authority to significantly improve the metal cutting performance of a boring bar.

Actuation Methodology

Controlling bending vibrations in thick bars and plates can require greater control authority than is available from conventional surface mounted actuators such as PZT patches. Instead, the first example boring bar actively damped the boring bar through the use of actuators such as PZT stack actuators. Mounted in material recesses near the bar root and offset from the neutral axis, the actuators induce bending moments in the bar through extensional motion. To facilitate understanding of this coupling mechanism, a simple model for the actuator/bar interaction is developed.

Using a normal mode expansion, the dynamic displacement of a bar in bending is given by $$u(z, t) = \sum_{r=1}^{\infty} \phi_r(z) q_r(t) \qquad \text{(equation 1)}$$

in which $\phi_r(z)$ are the mass normalized mode shapes and $q_r(t)$ are the modal displacements. For now the presence of actuators is not considered and the mode shapes reflect only the dynamics of the structure including any material recesses intended to accommodate actuators. The modal control forces are the projection of the external forces onto the modal sub-space given by the inner product $$Q_r(t) = \int_0^L \phi_r(z)f(z,t)dz \qquad \text{(equation 2)}$$

where f(z,t) is the external force per unit length.

Figure 7:
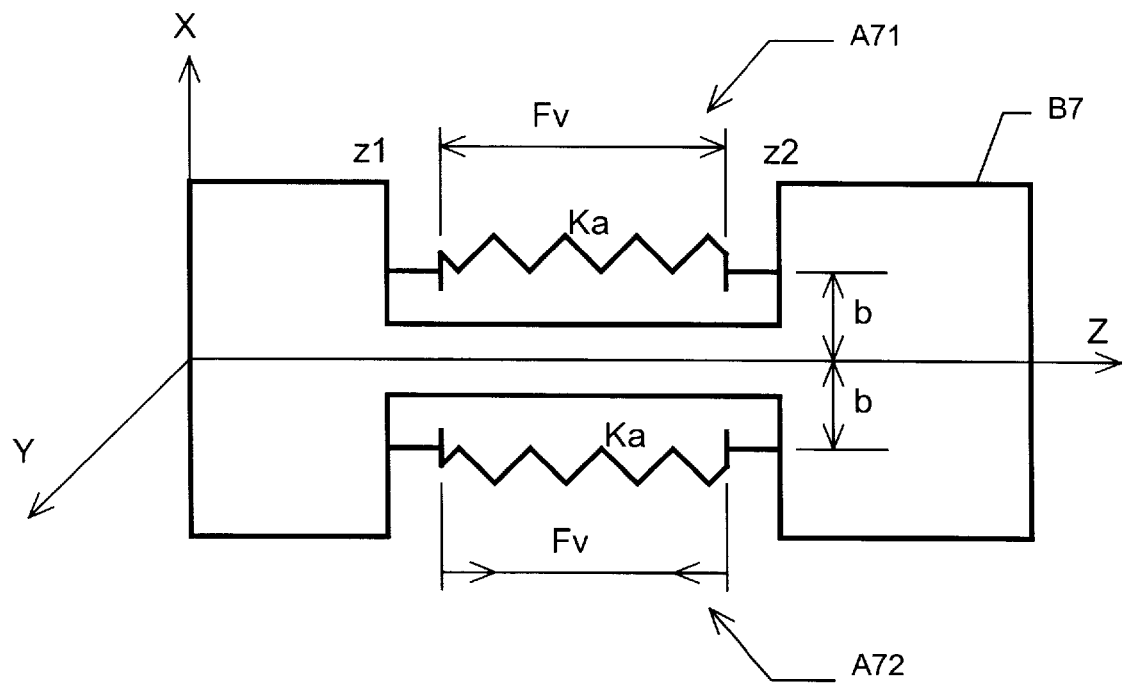
FIG. 7 is a schematic diagram of an actuator-bar interface.

A cross section of a bar B7 with schematic representations of actuators A71, A72 mounted in recesses opposite the beam center is shown in FIG. 7. Actuators A71, A72 contact bar B7 only at the end points z1, z2 as measured from the bar root. Offset from the neutral axis by a distance b, actuators A71, A72 have both a passive stiffness $K_a$ and a voltage induced strain resulting in a control force $F_v$. It is assumed that actuators A71, A72 are mounted such that the bending stresses in bar B7 are not transmitted to actuator A71, A72. Rather, bending deformation of bar B7 results in axial deformation of actuators A71, A72 as a consequence of the offset distance. The purpose of actuators A71, A72 is to produce equal and opposite forces to control bending about the Y axis, reducing the lateral displacements of bar B7 in the X direction. Neglecting actuator hysteresis, the total actuator force (active and passive) is given by $$F_a(t)=K_a(pd_{33}V(t)-\Delta L(t)) \qquad \text{(equation 3)}$$

in which p is the number of wafers in the stack, $d_{33}$ is the piezoelectric constant, V(t) is the input voltage, and $\Delta L(t)$ is the axial elastic deformation of the actuator resulting from bending deformations of the bar. $F_a(t)$ is positive when a compressive load is present in the actuator, and the force inputs into the bar are pointing away from the actuator tips. Direct coupling between the actuator and the bar is assumed by neglecting the compliance of additional mounting hardware.

Assuming that the actuator length is small relative to the modal node spacing in the actuator vicinity, the axial actuator deformations can be approximated geometrically by $$\Delta L_+(t)=b[\theta_y(z_1,t)-\theta_y(z_2,t)] \qquad \text{(equation 4)}$$

$$\Delta L_-(t)=b[\theta_y(z_2,t)-\theta_y(z_1,t)] \qquad \text{(equation 5)}$$

The subscripts + and − refer to the sign of the X coordinate at each actuator's location. The beam slope $\theta_y(z,t)$ is obtained from the first spatial derivative of the displacement given in equation 1 which leads to an alternate expression for the actuator deformations:

$$\Delta L_+(t) = -\Delta L_-(t) = b\left[\sum_{s=1}^{\infty}(\phi_s'(z_1)-\phi_s'(z_2))q_s(t)\right] \qquad \text{(equation 6)}$$

The effect of the total force (elastic and electromechanical) supplied by the actuators to the bar can be approximated as moments concentrated at the actuator-bar interfaces. Since the actuators are intended to supply equal and opposite forces to the system, therefore doubling the effect of a single actuator, we make the simplifying assumption that $F_{a-}(t)=-F_{a+}(t)$ Then, lumping the contributions from both + and − actuators, the discrete moments at the interfaces are given by $$M(z_1,t)=-M(z_2,t)=2bF_+(t) \qquad \text{(equation 7)}$$

The moment per unit length is given in distributed form $$m(z,t)=2bF_a+(t)(\delta(z-z_1)-\delta(z-z_2)) \qquad \text{(equation 8)}$$

in which δ is the Dirac delta function indicating that the moments are zero everywhere except at the actuator interface locations. An alternate expression for the moment distribution in terms of the actuator parameters and the modal deformations is given by substituting equations 3 and 4 into equation 8 to yield $$m(z,t) = 2bK_a\left[pd_{33}V9t)-b\sum_{s=1}^{\infty}(\phi_s'(z_1)-\phi_s'(z_2))q_s(t)\right] \qquad \text{(equation 9)}$$

$$(\delta(z-z_1)-\delta(z-z_2))$$

Finally, exercising the relation $f(z,t)=-\partial(z,t)/\partial z$, substituting equation 9 into equation 2, and integrating by parts gives the modal control forces as $$Q_r(t) = \qquad \text{(equation 9)}$$

$$2bK_a[\phi_r'(z_1)-\phi_r'(z_2)]\left[d_{33}V(t)-b\sum_{s=1}^{\infty}(\phi_s'(z_1)-\phi_s'(z_2))q_s(t)\right]$$

which includes both the piezoelectric effect and the elastic effect of both actuators. While the piezoelectric effect provides control authority through the applied voltage V(t), the elastic component couples the bar's natural modes. An alternative derivation includes the elastic component of the actuator force in a modal expansion of equation 1, using a different set of mode shapes and frequencies. This approach eliminates the passive coupling terms, leaving only the voltage component of equation 3. Although it is more cumbersome, the approach presented here verifies the passive stiffening effects of the actuators.

Note that the modal control forces depend on the actuator offset distance as well as the first spatial derivative of the mode shapes. Therefore, the modal control forces can be maximized by placing the actuators in locations of peak modal strain energy and maximizing the actuator offset distance. However, as seen in equation 4, the elastic deformations of the actuators are also directly proportional to the offset. The possibility of losing actuator pre-load as a consequence of static deflection of the tool in a cutting situation must be considered when placing the actuators.

Design

To verify the feasibility of the proposed actuation methodology as a technique for enhancing the damping in the boring bar, a surrogate tool testbed was implemented. Design philosophy centered on modifying a commercially available boring bar to facilitate performance evaluation through comparison with an unmodified bar. Specifically, a Kennametal model A32DDUNR4 2 inch diameter boring bar was modified to accept four Physique Instrumente Model P840.1 piezoelectric stack actuators in recesses near the bar root. The 16 inch long bar was mounted in a four jawed chuck leaving an effective tool length of 12 inches. Mounted at 90 degree intervals, the actuators functioned as two bi-morph actuator sets to control bending vibrations in two orthogonal axes. The recess dimensions were nominally 2 inches in length, 0.6 inches wide, and 0.45 inches deep. Recess depths were minimized to maintain structural integrity and to avoid interference with the bar's centrally located 0.25 inch diameter coolant tunnel. To avoid the transmission of bending stresses to the fragile PZT stacks, the actuator bar interfaces feature single point contacts with both mechanical and electrical preloads holding the actuators in place. Contact points were located at 0.5 inches and 2.5 inches as measured from the chuck jaws with a radial offset distance of 0.84 inches.

Static Stiffness Assessment

Because precision in the absence of vibration is governed by the tool's static stiffness, a finite element analysis was conducted to estimate the reduction in static stiffness resulting from the bar modifications. The bar was modeled using Abaqus with 5,000 solid elements. Abaqus Reference Manual, Ver. 5.5, Hibbitt, Karlsson & Sorensen, Inc., 1995. Geometric features of the cutting tip were not modeled in detail since it was assumed that the cutting tip would have little influence on the overall bar dynamics. Spring elements were used to represent the axial stiffness of the actuators as well as the soft boundary conditions imposed by the chuck. Vendor provided actuator stiffnesses of 55N/mm were used in the analysis, while the boundary springs were tuned to match first mode bending frequencies taken from test data. Generic material values for steel were used to represent the bar's properties.

Figure 8:
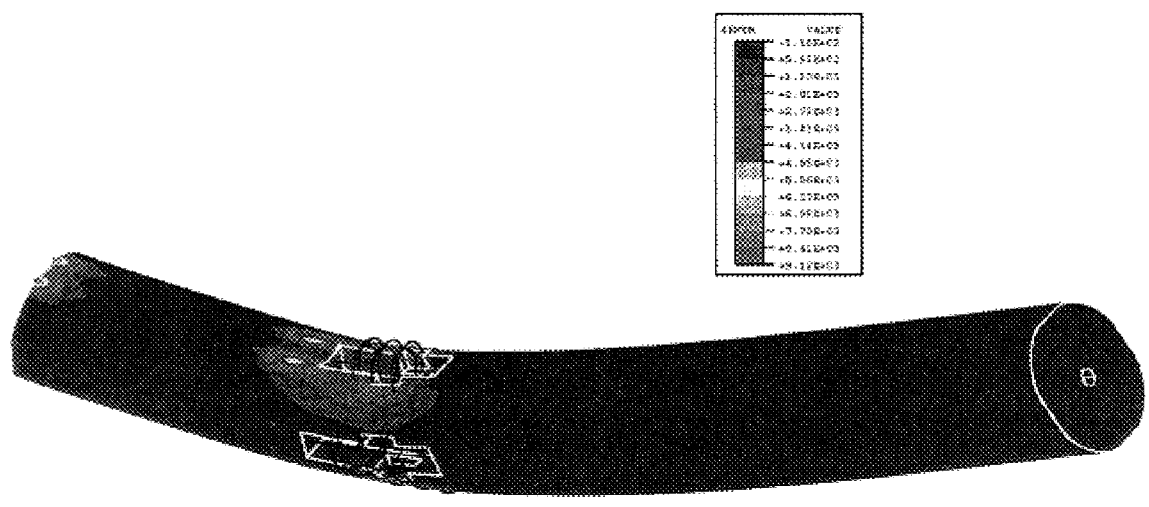
FIG. 8 is an illustration of a mode of a first example boring bar according to the present invention.

The results of the finite element analyses are summarized in Table 1, illustrating that the inclusion of the recesses reduces the static stiffness by 16%. Some stiffness is recovered by the addition of the passive actuators, with the overall reduction shifting to 13.5%. Also shown in Table 1 are the frequencies for the first bending modes in the X (normal to workpiece) and Y (tangential) directions. The bar modifications yield approximately a 3% reduction in the natural frequencies. The shapes estimated from the finite element model for these two modes are shown in FIG. 8, in which the axial springs included to simulate the passive stiffening effects of the actuators are evident. The contours superimposed on the mode shapes reveal high strain energy levels in the vicinity of the actuator/bar interfaces. This result indicates that good coupling between the actuation and the critical vibrational modes can be achieved.

TABLE 1

|  | Unmodified Bar | Bar with Recesses | Bar with Actuators |
| --- | --- | --- | --- |
| X stiffness (lb/in) | 21353 | −15.8% | −13.3% |
| Y stiffness (lb/in) | 21868 | −16.1% | −13.6% |
| X frequency (Hz) | 214 | −3.7% | −2.8% |
| Y frequency (Hz) | 220 | −4.1% | −3.2% |

Testing of First Example Boring Bar

An extensive bench top testing program of the first example boring bar was conducted. Highlights of the test program with an emphasis on the ability of the actuation approach to influence the bar damping are now summarized. Simulated performance enhancements will be summarized in the following section.

Figure 9:
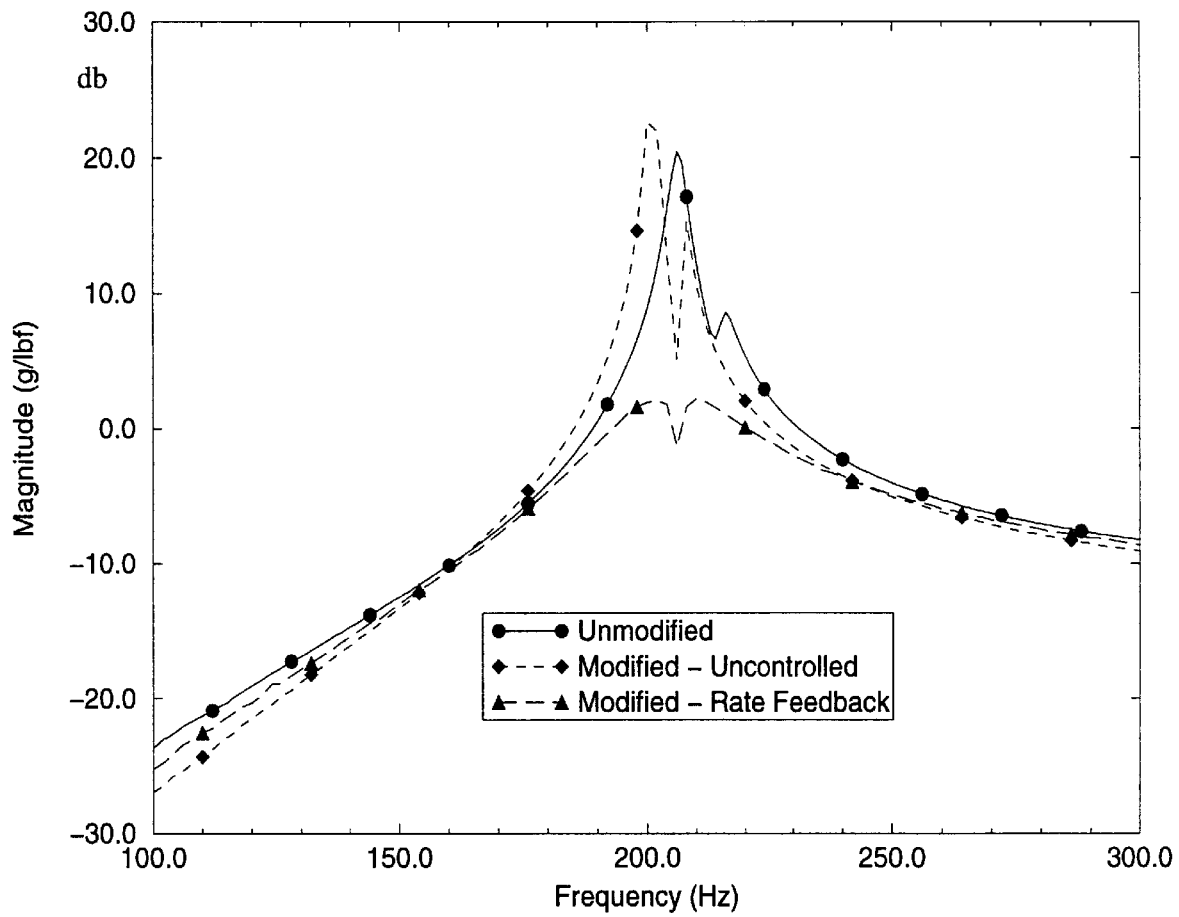
FIG. 9 is a plot comparing tip transfer functions.

In general, the results of the first example boring bar were very encouraging, suggesting the potential for achieving significant improvements in the dynamic characteristics of the boring bar. A comparison of the driving point tip transfer functions along the X direction for the original bar, the modified bar without feedback control, and the modified bar using rate feedback control for active damping is shown in FIG. 9. Although the modifications slightly compromise the static stiffness of the bar as previously described, the dynamic stiffness in the vicinity of the first mode near 205 hertz is greatly increased through the application of the feedback control, producing a 18 db reduction in modal amplitude. As will be illustrated in the following section, suppressing the first mode expands the performance envelope of the cutting system.

Example Simulation-Based Evaluation

Figure 10:
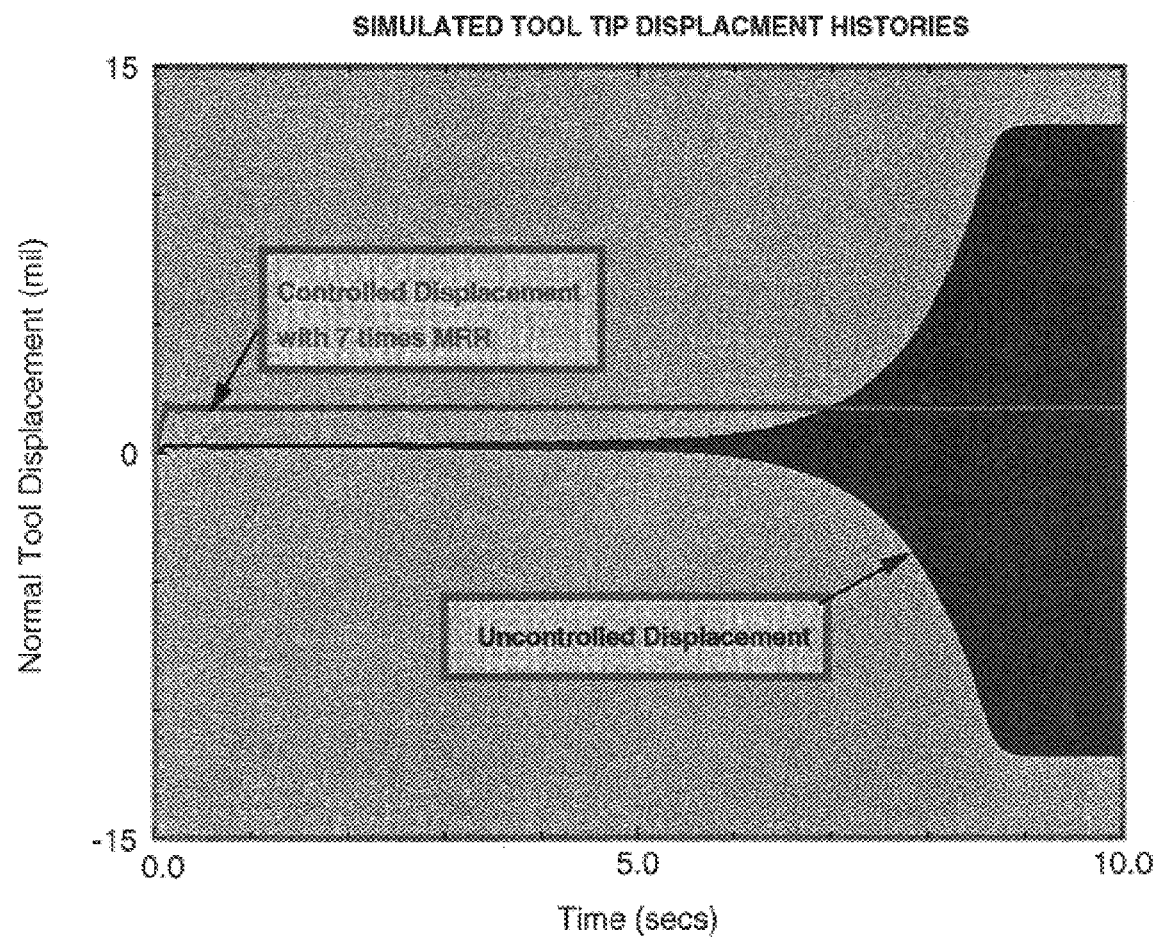
FIG. 10 is a plot of simulated tool tip displacement history normal to the workpiece surface for a first example boring bar.

To illustrate the impact active damping can have on the performance of the boring bar, dynamic models were fit to the modified bar with and without active control. These tool models were used to simulate cutting on a 2 inch diameter cast iron bar with 0.01 inch depth of cut and workpiece speed of 600 rpm. Tool vibration history normal to the workpiece surface is shown in FIG. 10. With an infeed rate of 0.01 inches per revolution, the uncontrolled bar produces an unstable cut, with the steady state amplitude of the chatter approximately equal to the depth of cut. The controlled case, however, shows a stable cutting condition despite increasing the infeed rate to 0.075 inches per revolution. A larger static deflection of the bar as a result of the increased cutting forces is evident in this case.

Figure 11:
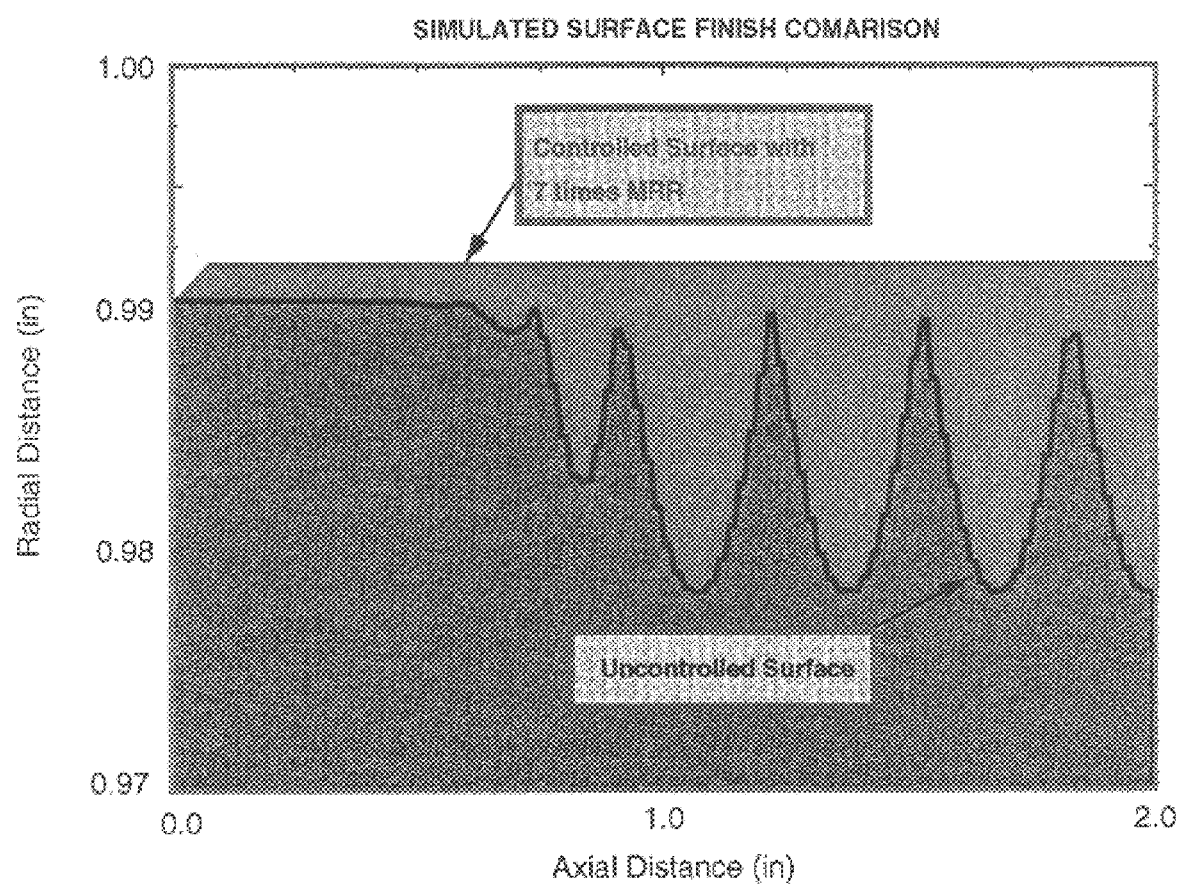
FIG. 11 is a simulated axial cross-sectional profile of a machined workpiece.

Simulated workpiece surface profiles are illustrated in FIG. 11 which shows an axial cross-section of the workpiece near the surface. While the controlled case produces a relatively smooth surface, the surface resulting from the uncontrolled case exhibits waviness that is characteristic of chatter vibrations. In summary, the increased stability of the controlled case offers an enlarged stable machining envelope, improved surface finishes, less scrap, and longer cutting tool life.

Single Versus Bi-Morph Actuation

In the previous section, the active damping results were obtained using a bi-morph actuator configuration, in which two actuators mounted on opposite sides of the bar work in unison. The benefits of this approach are two-fold. First, by supplying equal and opposite control forces (relative to the pre-load) the bi-morph configuration doubles the effectiveness of a single actuator without adding significant complexity to the control system. Secondly, the electrical and mechanical pre-loads of the actuators cancel, yielding a zero net static deflection of the bar tip in the lateral direction prior to cutting. However, this approach has substantial added cost in the form of greatly reduced static stiffness of the bar. Finite element analyses suggest that the lateral static stiffness loss resulting from inclusion of the active control hardware can be reduced to less than 7% if only a single actuator is used. The single actuator approach is then superior if system performance is not limited by actuator force capability, and results comparable to the bi-morph case can be achieved. This appears to be the case in the first example boring bar.

Figure 12:
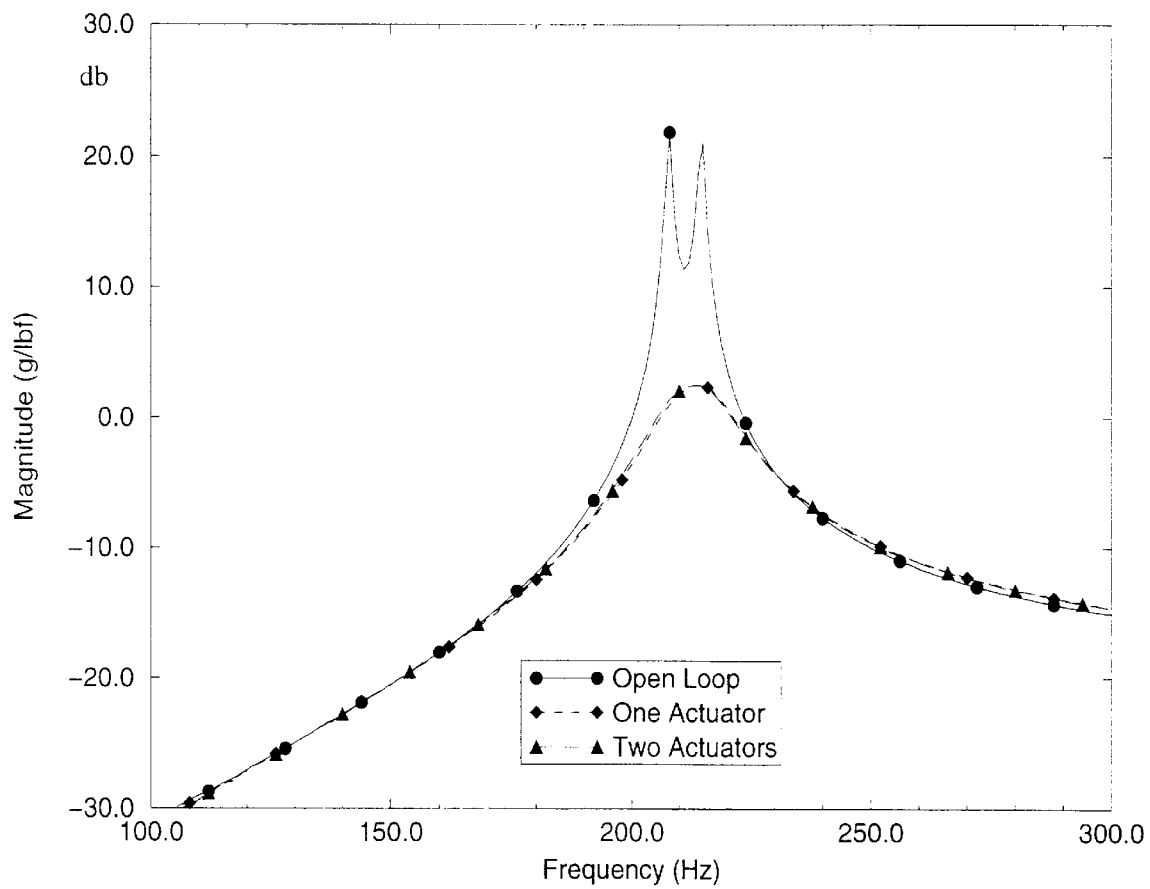
FIG. 12 is a comparison of a Y transfer functions.

FIG. 12 shows a comparison of the Y tip transfer function magnitudes of the first example boring bar for the open loop system, the closed loop system using the bi-morph actuators with a rate feedback control, and the closed loop system using one actuator in each direction with double the gain of the bi-morph case. Both normal and tangential vibration control loops were active in the two control cases which exhibited nearly identical performance. Therefore, the damping forces produced in this example were well within the capacity of the single actuator configuration. Although the redundant actuator adds a measure of robustness in the case of actuator failure, the added complexity and loss of static stiffness can make it an unattractive alternative. Furthermore, static deflection resulting from a biased pre-load is not necessarily problematic, and in some cases can be beneficial. Since in all boring operations the static component of the cutting forces results in a deflection of the tool tip down and away from the workpiece, the actuator pre-loads can be used to partially compensate for this bias if the actuators are located on the lower and aft portions of the bar.

Second Example Boring Bar

Vibration suppression according to the present invention was further demonstrated in a second example boring bar. The stability against chatter and the dependence on principal axis orientations and actuator location are first described, followed by the discussion of the bar design and measured performance.

Principal Axes Orientation

The dynamics of the first example boring bar were in large part influenced by the four jawed chuck used to secure the surrogate tool to the seismic base. Minor changes in the mounting procedure altered the orientation of the bar's principal axes, affecting the amount of coupling evident in the tangential and normal directions. Since slight variations in tool mounting procedures can be expected on the shop floor, the influence of axes orientation on bar performance must be considered in order to properly place the actuators on the prototype bar.

One method of evaluation is to examine the bar's oriented transfer function which relates the bar displacement normal to the workpiece surface to the resultant cutting force. For simple turning operations, it has been shown that the limiting depth of cut is inversely proportional to the minimum real part of the oriented transfer function $G_{or}$ written as:

$$b_{\lim} = \frac{1}{2k_s[Re(G_{or})]_{\min}} \quad \text{(equation 10)}$$

For cut depths below $b_{1im}$ the process is unconditionally stable, and processes that lie above $b_{1im}$ can result in unstable regenerative vibration. Thus, the minimum real part of the oriented transfer function is used here as a measure of stability against chatter vibrations, with a smaller value (in an absolute sense) indicating a more stable process.

Figure 13:
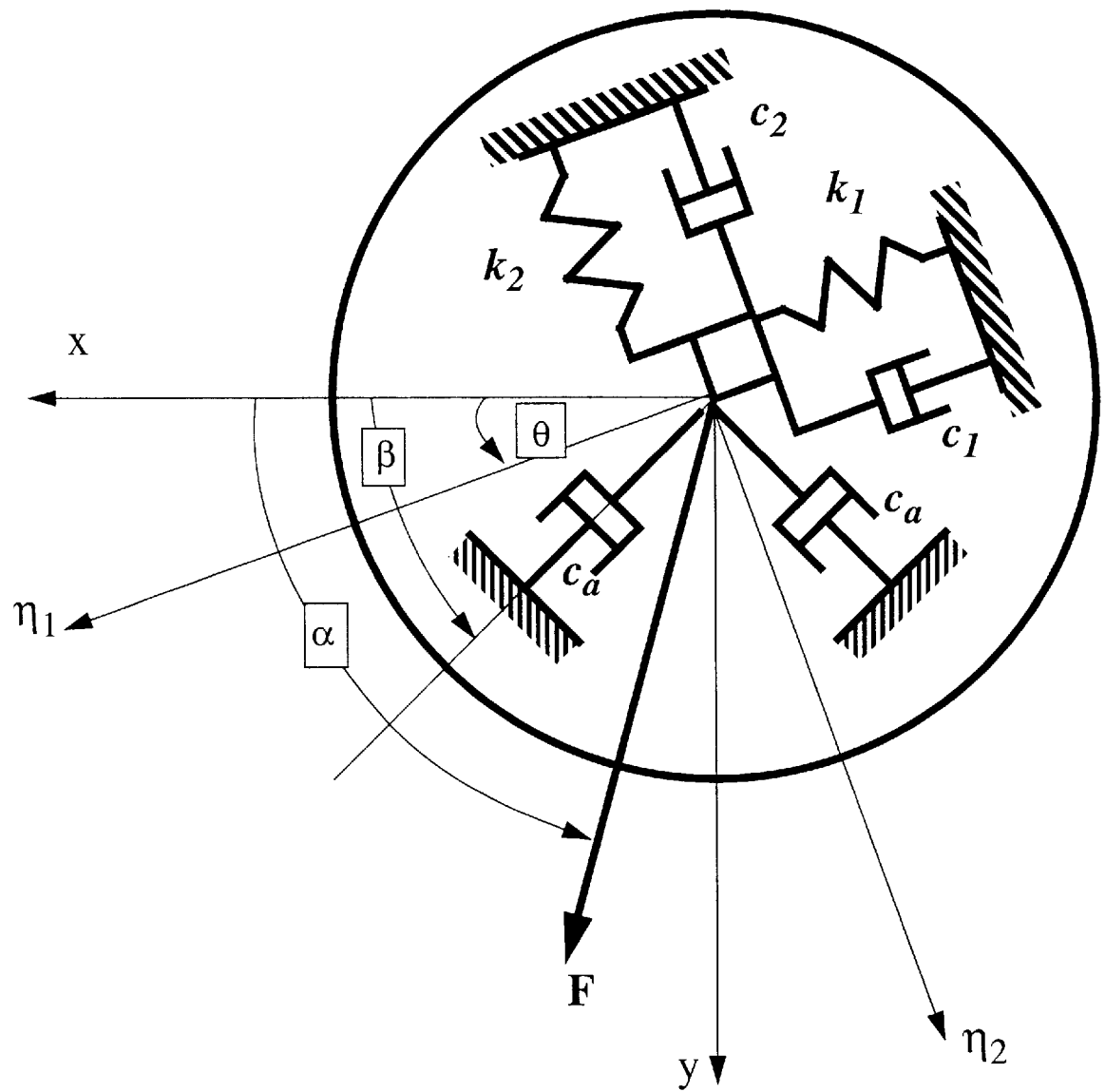
FIG. 13 is a two degree of freedom model of a boring bar according to the present invention.

To this end, we examine a simple two degree of freedom model of the boring bar shown in FIG. 13. Springs and dampers are located along the principal axes of the bar, which are rotated by angle $\theta$ with respect to the normal and tangential directions denoted by X and Y. The cutting force is shown inclined at angle $\alpha$ relative to the normal direction. Also present are dampers meant to represent the influence of the control actuators. The effects of these elements will be considered later and we now consider only the dynamics of the bar. In the principal coordinate system, the decoupled equations of motion are written as $$m[\$]\$\ddot{g h}_1(t)+k_1\dot{\eta}_1(t)+k_1\eta_1(t)=F_1(t) \quad \text{(equation 11)}$$

$$m[\$]\$\ddot{g h}_2(t)+k_2\dot{\eta}_2(t)+k_2\eta_2(t)=F_2(t) \quad \text{(equation 12)}$$

in which the components of the cutting force $F_1$ and $F_2$ are aligned with the principal axes directions. To derive the oriented transfer function, we first convert the equations of motion to the driving point transfer functions in the principal axes system to yield $$\frac{\eta_1(s)}{F_1(s)} = \frac{1/m}{s^2 + 2\zeta_1\omega_1 s + \omega_1^2} = G_{11}(s) \quad \text{(equation 13)}$$

$$\frac{\eta_2(s)}{F_2(s)} = \frac{1/m}{s^2 + 2\zeta_2\omega_2 s + \omega_2^2} = G_{22}(s) \quad \text{(equation 14)}$$

Next, this system must be rotated to the cutting coordinate system, with the coordinate transformation defined by $$\begin{bmatrix} x \\ y \end{bmatrix} = \begin{bmatrix} \cos\theta & -\sin\theta \\ \sin\theta & \cos\theta \end{bmatrix} \begin{bmatrix} \eta_1 \\ \eta_2 \end{bmatrix} = T\eta \quad \text{(equation 15)}$$

Note that this transformation applies to the forces as well as the displacements. Then, the X and Y forcing functions can be expressed as components of the cutting force $$\begin{bmatrix} F_x \\ F_y \end{bmatrix} = \begin{bmatrix} \cos\alpha \\ \sin\alpha \end{bmatrix} F \quad \text{(equation 16)}$$

After applying the appropriate transformations, the oriented transfer function for the actuator free case is given by $$\frac{x(s)}{F(s)} = G_{or}(s) = (\cos\theta^2 G_{11} + \sin\theta^2 G_{22})\cos\alpha + \cos\theta\sin\theta(G_{11} - G_{22})\sin\alpha \quad \text{(equation 17)}$$

Figure 14:
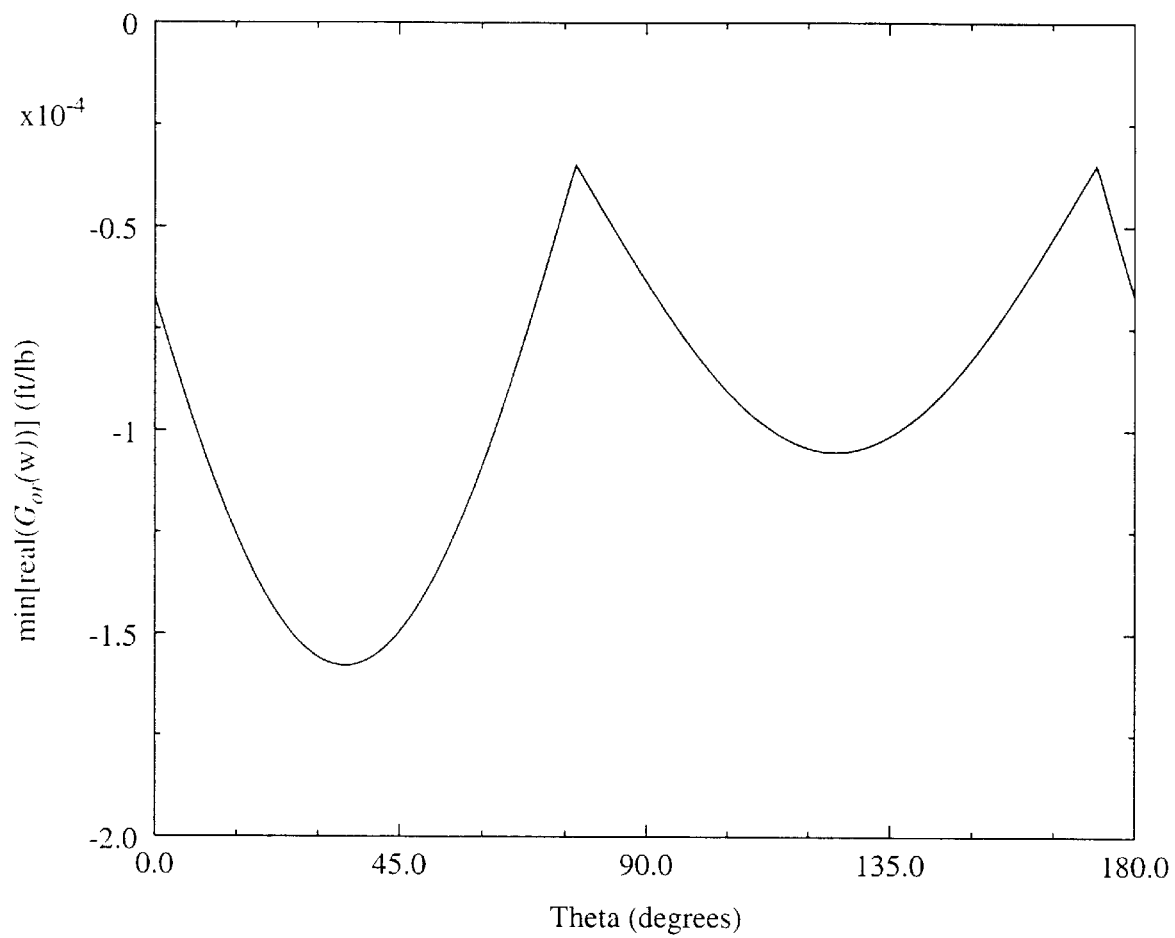
FIG. 14 is a graph of the effect of principal axis orientation on cutting process stability without active vibration damping.

The oriented transfer function exhibits a strong dependence on the principal axes orientation. The influence on the stability of the cutting process, however, cannot be readily deduced from examination of equation 17. Instead, a plot of the minimum real part of the oriented transfer function using the model parameters as previously described is shown in FIG. 14. Recognizing the symmetry in the orientations, only the angles from 0 to 180 degrees are plotted. The modal frequencies ($\omega_1$=214 hz, $\omega_2$=220 hz) were taken from the finite element analysis results described previously, and the lumped mass of 0.14 slugs was estimated through consideration of the estimated stiffnesses. The damping values were chosen to provide 0.5% critical damping in each mode. The cutting force angle was fixed at seventy degrees relative to the X axis for this and subsequent analyses. As indicated in the plot, the principal axes orientation has a surprisingly large effect on the cutting process stability despite only slight differences in the modal parameters. A cutting process with an orientation angle of 80 degrees is approximately five times more stable than a process with an angle of 35 degrees. Previous test results indicated that both outcomes are equally likely owing to subtle variations in the boring bar mounting procedure. Therefore, an actuator arrangement that minimizes the significance of the mounting procedure is highly desirable.

Single Axis Control Orientation

The number and location of the actuators on the active boring bar are of importance in effectively increasing the damping of the boring bar system while minimizing static stiffness loss and system complexity. From initial studies, it was determined that the imbedded PZT actuation methodology is most effective when implemented at the root of the cantilevered bar. However, simulation results indicated that the optimal actuator configuration is not so obvious. In some cases, better performance was achieved when single axis damping was aligned with the tangential rather than the normal direction. This result can be counter intuitive since it is the vibration normal to the workpiece surface that can lead to regenerative chatter. Therefore, the simple model of FIG. 13 is used to investigate the significance of actuator orientation.

In order to determine the optimal actuator configuration, we first consider the addition of a single actuator to the system of equations 11 and 12. The actuator is oriented at angle $\beta$ with respect to the X axis, and its net effect is represented by the damping element $c_a$ shown in FIG. 13. Note that an additional actuator is located orthogonal to the first, but for now only the first actuator will be considered. The modified system can now be represented as $$m[\$]\$\ddot{g h}_1(t)+(c_1+c_a\cos(\beta-\theta)^2)\dot{\eta}_1(t)+k_1\eta_1(t)=F_1(t)-c_a\cos(\beta-\theta)\sin(\beta-\theta)\dot{\eta}_2(t) \quad \text{(equation 18)}$$

$$m[\$]\$\ddot{g h}_2(t)+(c_2+c_a\cos(\beta-\theta)^2)\dot{\eta}_2(t)+k_2\eta_2(t)=F_2(t)-c_a\cos(\beta-\theta)\sin(\beta-\theta)\dot{\eta}_1(t) \quad \text{(equation 19)}$$

which illustrates the resulting cross coupling of what were the principal axes. A transformation of coordinates similar to that previously described can then be undertaken to arrive at the oriented transfer function.

Figure 15:
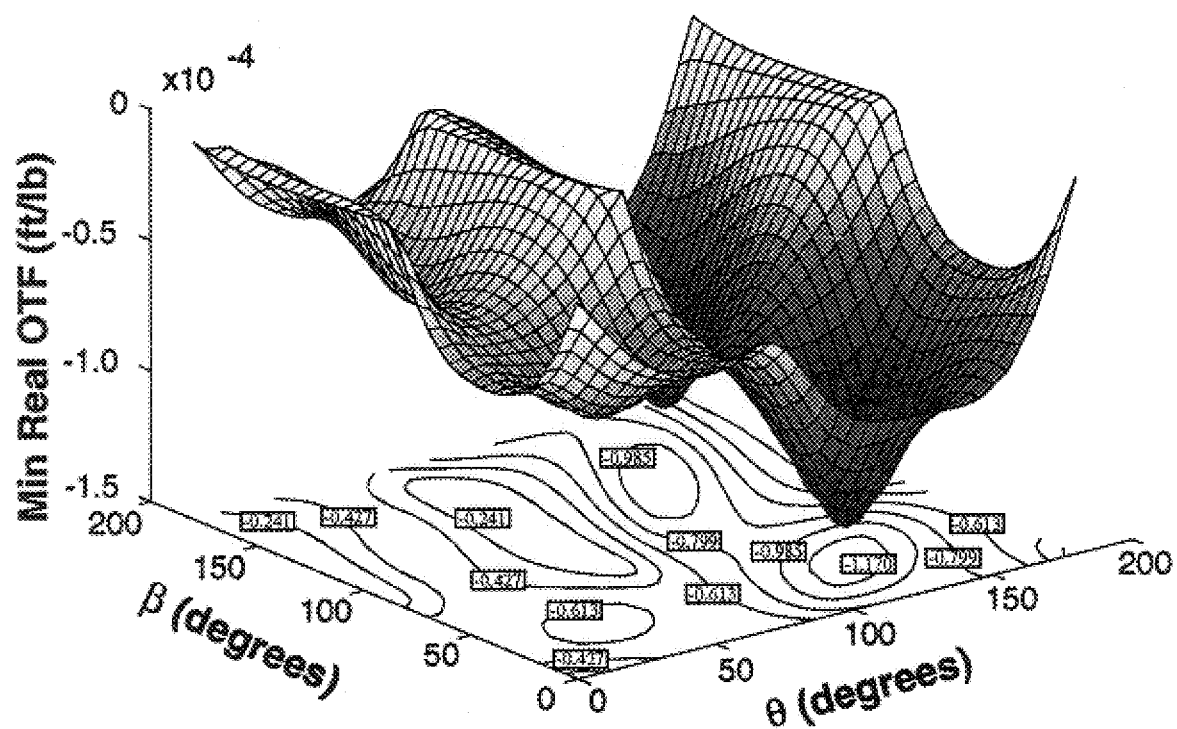
FIG. 15 is a graph of cutting process stability as a function of axes orientation and actuator location for one actuator.

For this analysis, the actuator damping is fixed such that it provides 5% critical damping along its axes, which is a conservative value based on the results of the experiments performed on the first example boring bar. The minimum real part of the oriented transfer function is plotted in FIG. 15 for the range of principal axes orientations and actuator locations. As in the previous case, symmetry permits examination of the 0 to 180 degree range for both variables. For many axes orientations, having the actuator aligned with the X axis ($\beta=0$) provides a near optimal result in that it minimizes (in an absolute sense) the real part of the oriented transfer function. But this is not valid for all axes orientations. In particular, for the case of $\alpha=60$ degrees, an actuator inclined 60 degrees to the X axis provides better than a two-fold increase in stability as compared to an actuator aligned with the X axis. In addition, as compared to axes orientations in the 100 to 180 degree range, the damper is relatively ineffective for orientations ranging from 30 to 50 degrees.

As previously noted, the mounting procedure can have a dramatic impact on the system dynamics, making virtually any orientation of the principal axes possible. The analysis summarized in FIG. 15 indicates that satisfactory performance cannot be guaranteed using a single actuator. For some orientations, an actuator aligned normal to the workpiece will provide the best possible result, while in other cases cutting stability can be maximized using a tangentially aligned actuator. The possibility of achieving maximum performance through the inclusion of a second actuator is next considered.

Dual Axis Control Orientation

In an effort to create an active boring bar design that minimizes the influence of axes orientation on closed loop performance, we now consider the addition of a second actuator mounted orthogonal to the original as shown in FIG. 13. Assuming that the damping provided by each actuator is identical, the equations of motion in the principal axes coordinate system are given by $$m[\$]\$''g\ddot{h}_1(t)+(c_1+c_a)\dot{\eta}_1(t)+k_1\eta_1(t)=F_1(t) \quad \text{(equation 20)}$$

$$m[\$]\$''g\ddot{h}_2(t)+(c_2+c_a)\dot{\eta}_2(t)+k_2\eta_2(t)=F_2(t) \quad \text{(equation 21)}$$

Figure 16:
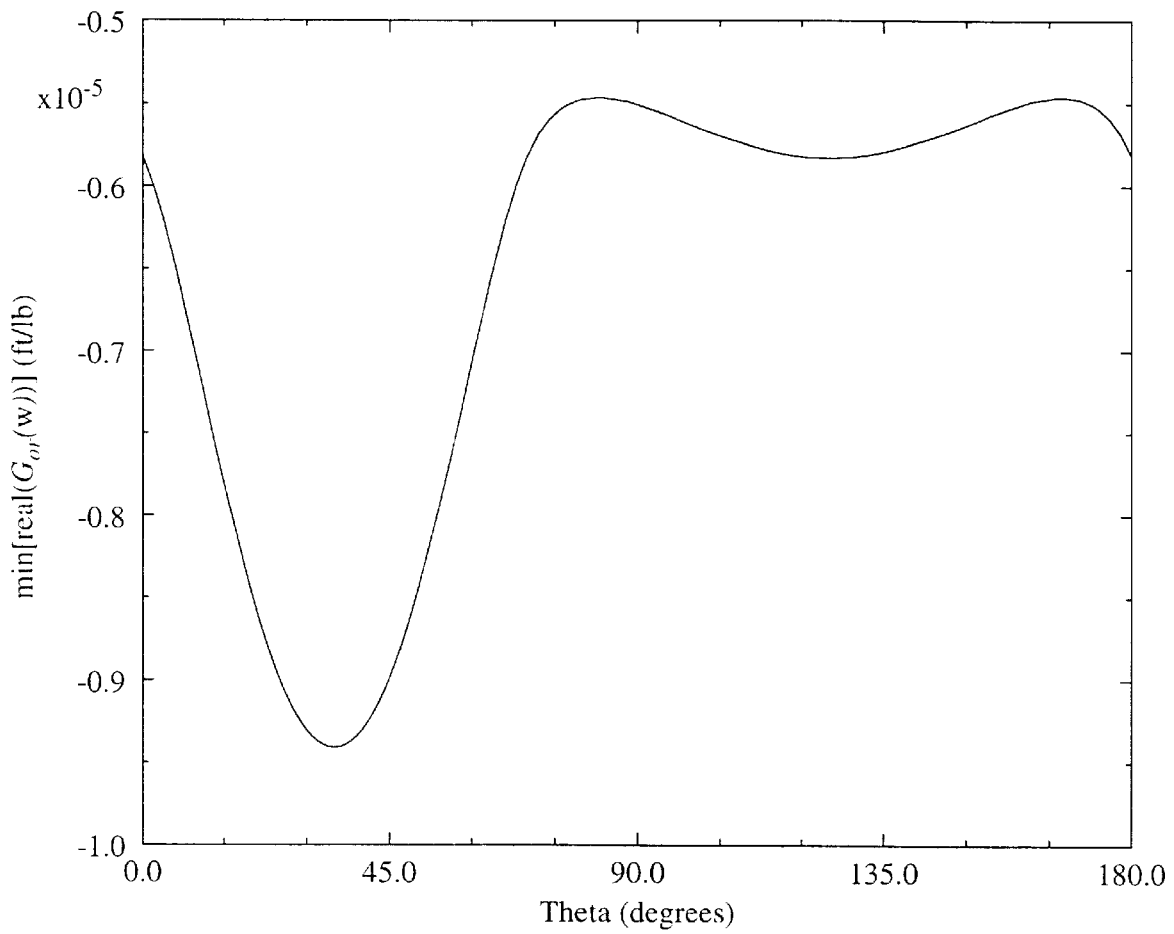
FIG. 16 is a graph of cutting process stability as a function of axes orientation with two orthogonal active dampers.

Thus, the addition of the second actuator orthogonal to the first eliminates the dependence of the dynamics on the actuator locations. After again transforming coordinates to arrive at the oriented transfer function, the performance of the boring bar is summarized in FIG. 16. Note that although the minimum real part of the oriented transfer function again varies over the range of principal axes orientations, the worst case scenario for the two actuator case ($\theta=35$ degrees) offers a ten fold improvement over the worst case expected for the single actuator case. In addition, the best and worse performance for the two actuator case differ by less than a factor of two as compared to greater than ten for the single actuator case.

Design

Two orthogonal actuators were mounted in the normal and tangential directions on the lower and aft sides of the bar relative to the workpiece. Although any orientations would suffice, these directions were selected because the static deflection of the boring bar subject to the cutting forces results in compressive loads at the actuator locations. Furthermore, the mechanical and electrical pre-load of the actuators at the chosen locations have the added benefit of compensating for the tool's static deflection which leads to dimensional errors on the finished workpieces.

Valenite brand boring bars in the two-inch diameter class were selected as the host boring bars for prototype development. A pristine boring bar of identical make and model was left unmodified to enable quantitative assessments of the active boring bar performance. Physik Instrumente PZT stack actuators were mounted in recesses at the bar root for vibration control. A self sensing actuator scheme in which the selected piezoelectric stacks function simultaneously as both a sensor and an actuator was carefully considered for this application. This approach is attractive in that collocated sensors and actuators enable the use of low order control algorithms with stabilizing spillover into the uncontrolled modes. However, it was determined that tip mounted accelerometers were more suited as sensors for this vibration control task due to the low strain levels registered at the actuator locations. Although a number of feedback control schemes were considered on the first example boring bar, rate feedback produced damping levels comparable to more sophisticated algorithms. Thus, this approach was chosen over other techniques for the second example boring bar because of its simplistic implementation.

Test Program Overview

Figure 17:
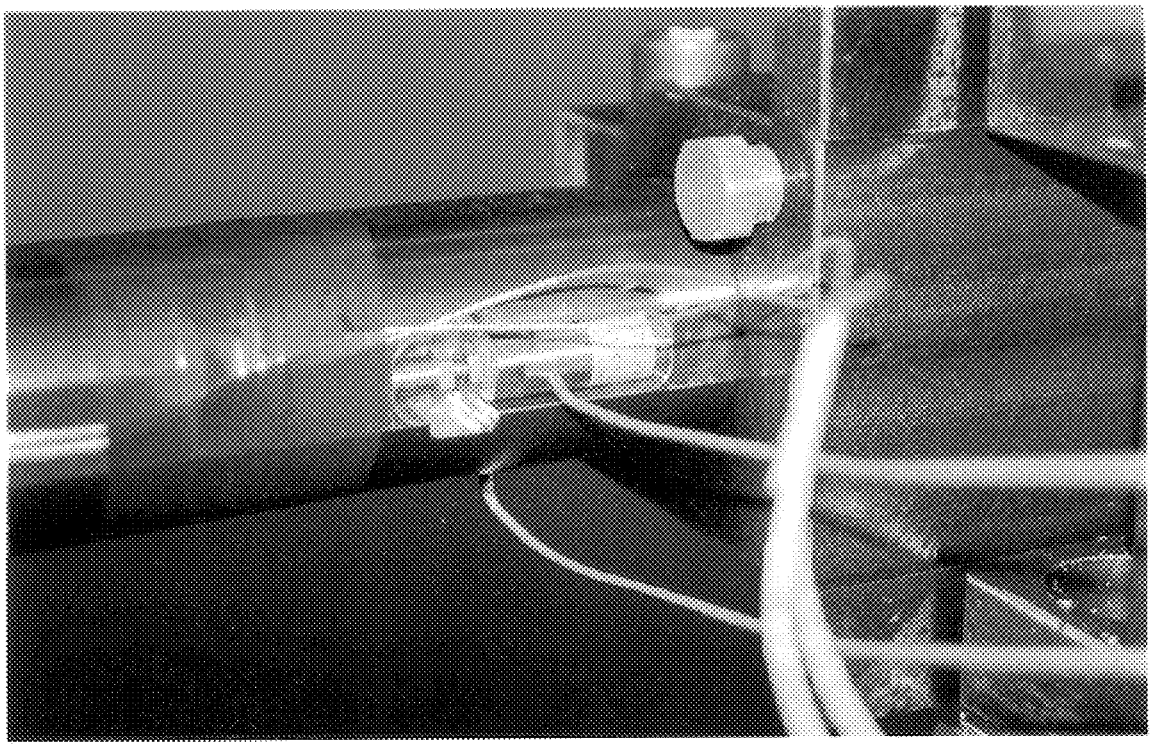
FIG. 17 shows a boring bar modified according to the present invention.

A Binns and Barry horizontal lathe machine was used for the cutting tests of the second example boring bar. The second example boring bar comprised a two inch diameter steel shank Valenite bar (model S32-MCLNL6) fitted with a titanium nitride coated cutting Valenite cutting insert (model CNMP643 SV4). All cutting tests described herein were performed using an 6 inch diameter 4340 steel workpiece that had been heat treated to a hardness of 42 Rockwell 'C' scale. The bar was modified to incorporate Physik Instrumente PZT stack actuators (model 840.1) near the bar root as shown in FIG. 17. The actuators were mounted using mechanical preload, with the rounded actuator fittings being housed in the concave recess ends. The actuators were mounted on the lower and aft sections of the bar to suppress bending vibrations tangential and normal to the workpiece surface, respectively. Tip mounted Endevco accelerometers (model 22) provided the input to the two independent rate feedback control algorithms running on the DSpace controller. System condition was monitored using an Hewlett Packard 3565s system operating at 4096 samples per second.

The test series completed on the Binns and Barry lathe consisted of open and closed loop frequency response functions of the tool mounted in the tool holder, open and closed loop point cutting comparisons, and a cutting survey to compare the overall performance of the prototype tool with an unmodified bar of the same make.

Frequency Response Functions

Figure 18:
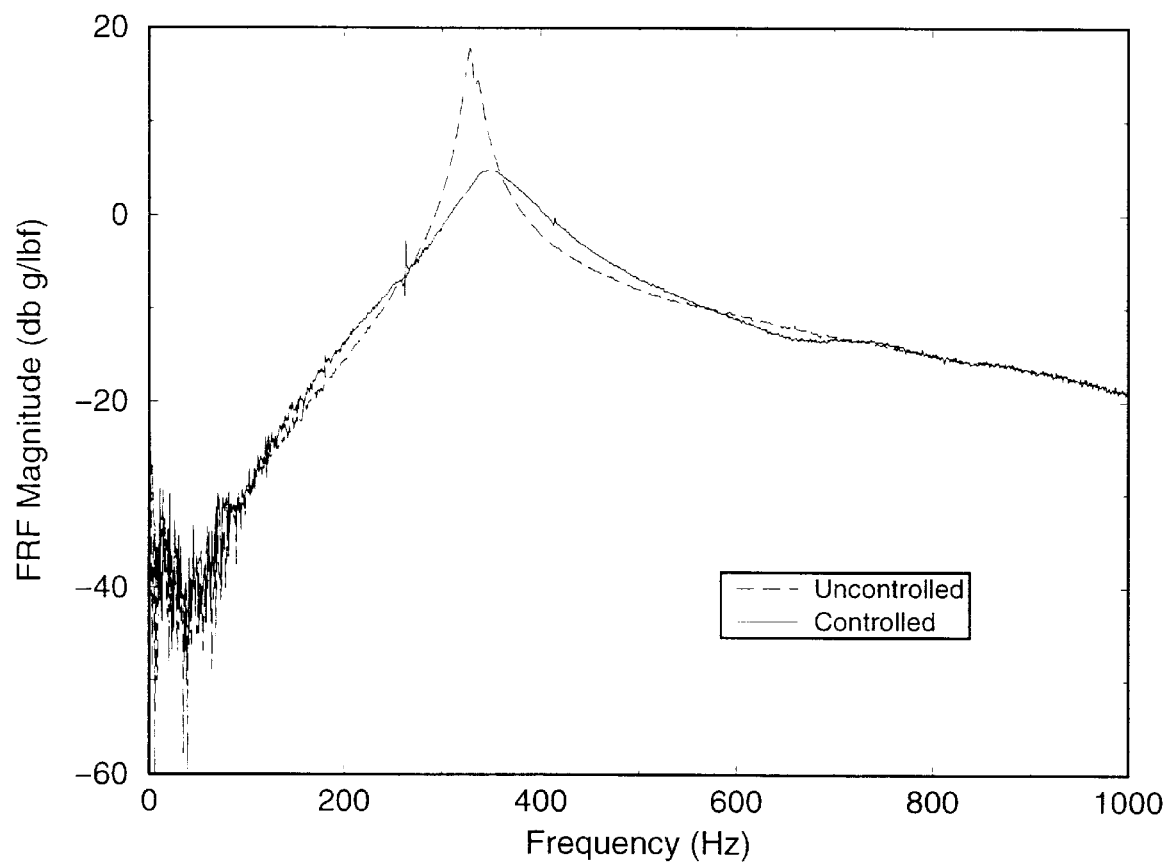
FIG. 18 is a graph of tangential tip driving point FRF.
Figure 19:
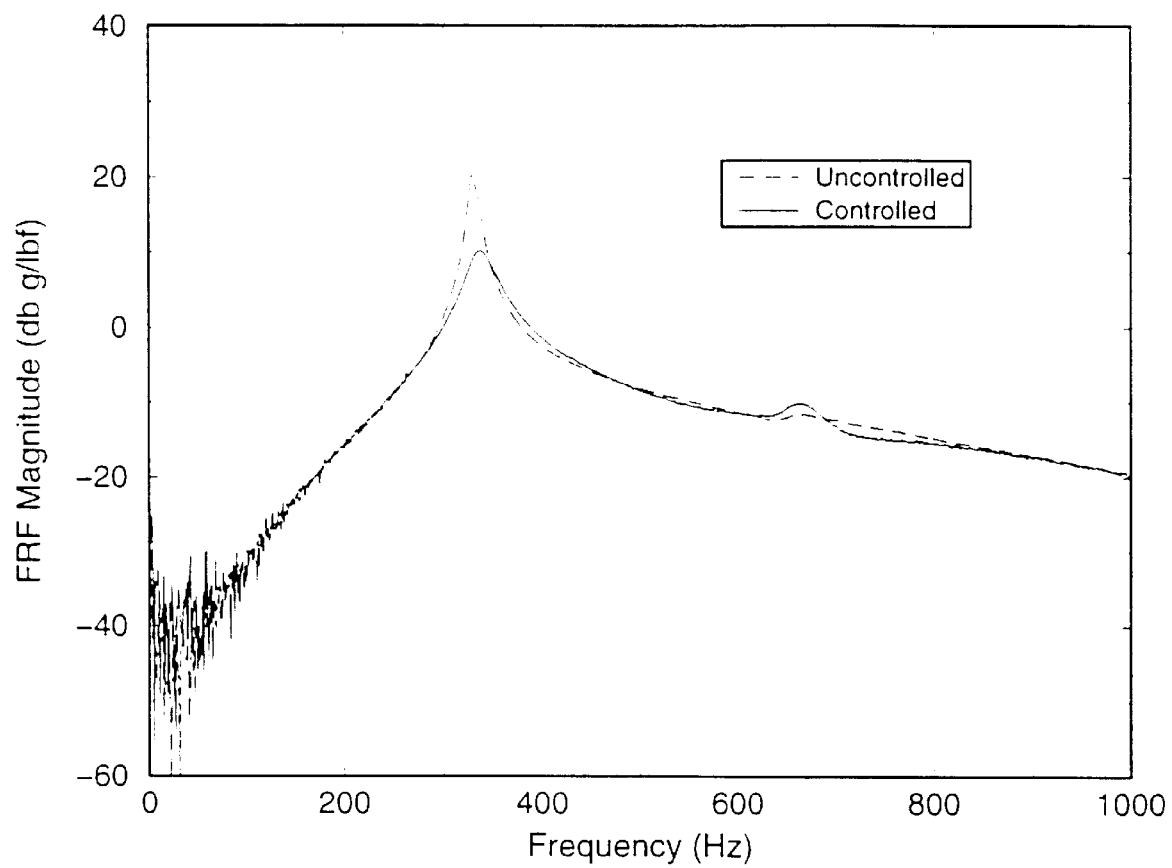
FIG. 19 is a graph of normal tip driving point FRF.

A comparison of the normal and tangential frequency response functions is given in FIG. 18 and FIG. 19, respectively. A double pole is evident in the vicinity of 330 Hz, indicating the presence of the first bending mode in both the normal and tangential directions. Note that the resonant frequency of the bar is considerably higher than that of the first example boring bar, indicating that the machine's tool clamp is much more rigid than the chuck used in the bench top tests of the first example boring bar. A 15 db reduction in the resonant peaks result from the application of active vibration control. While this reduction is considerably less than the 18 db drop achieved in the benchtop tests, the difference can be attributed to a higher initial damping in the machine mounted tool which effectively reduces the impact of the actuator inputs. For this machine mount case, the tangential and normal modal damping ratios increased from 2.1% and 1.5% to 9.0% and 4.0% respectively. Thus, a significant improvement in cutting performance between the open and closed-loop cases can still be expected for the modified bar.

Cutting Demonstrations

Four different sets of cutting conditions were examined to illustrate the difference in bar vibration between the control-on and control-off cases. In the absence of active vibration control, the data clearly indicates the existence of chatter for each case considered. Chatter is eliminated with the activation of the active vibration control, but varying degrees of ambient vibration persist depending on the cutting conditions. In general, the higher depths of cut led to higher vibration levels. Note that although these examples provide insight into how the active vibration control influences behavior, they do not adequately reflect the potential of the active vibration control. For some cutting conditions, active vibration control may be unable to eliminate chatter once its initiated because the stroke capacity of the actuators are exceeded. However, under the same cutting conditions, the presence of active vibration control from the start of the cut may prevent chatter from developing at all. Therefore, the successful chatter prevention envelope under active vibration control can be much larger than the chatter elimination envelope.

Although vibration normal to the workpiece surface is the driving force behind the development of chatter, controlling the tangential vibration proved to be critical to the elimination of chatter as a consequence of its larger vibration amplitude and the tangential-normal vibration coupling previously described. In addition, the tangential vibration played an important role in defining the characteristics of the chatter vibration when it occurred. The chatter amplitude normal to the workpiece surface was significantly less than the depth of cut in each case considered. Instead, the saturation amplitude revealed a dependence on the speed of the workpiece, indicating that the chatter grew until the cutting tip intermittently separated from the workpiece as a consequence of the tangential vibration. This occurred when the speed of the vibrating tool tip along the tangential direction exceeded the surface speed of the workpiece.

Depth of cut 0.005 Inches

Figure 20:
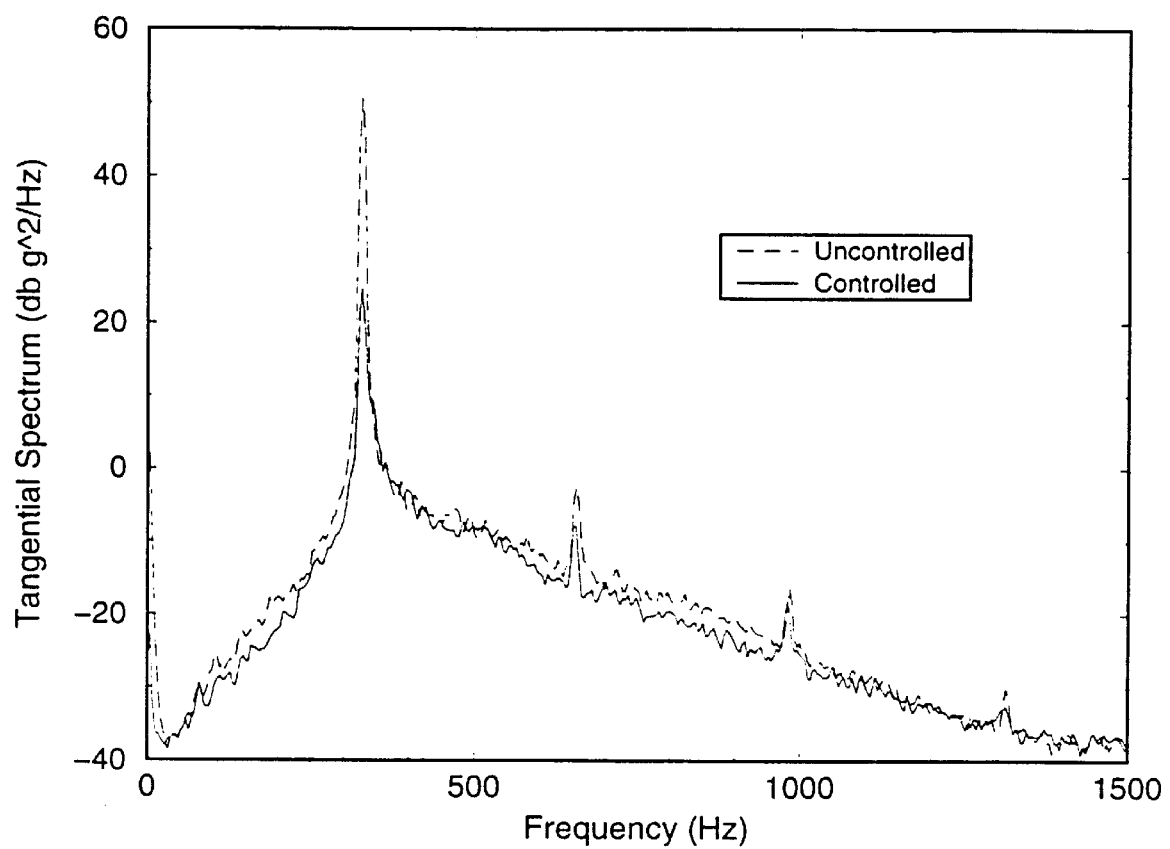
FIG. 20 is a graph of tangential acceleration spectrum for 5 mil depth of cut.
Figure 21:
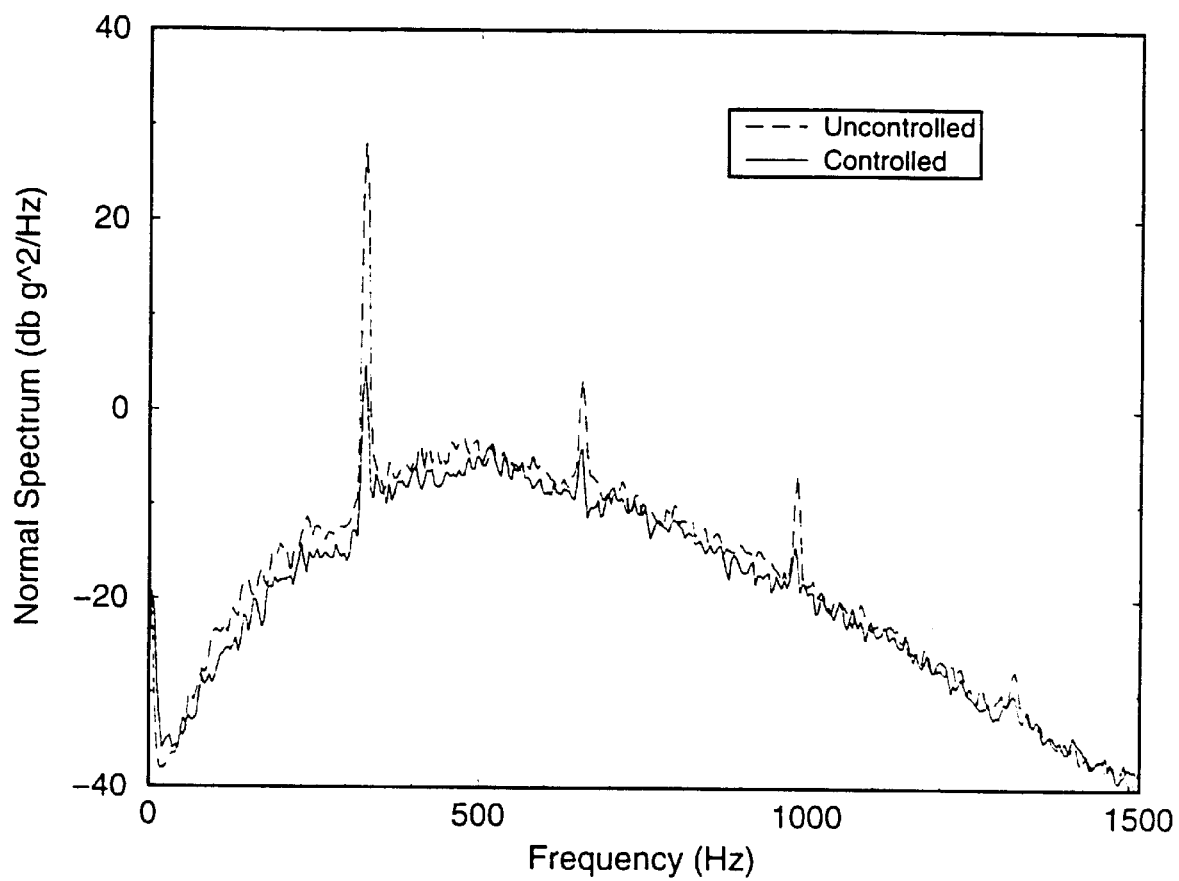
FIG. 21 is a graph of normal acceleration spectrum for 5 mil depth of cut.
Figure 22:
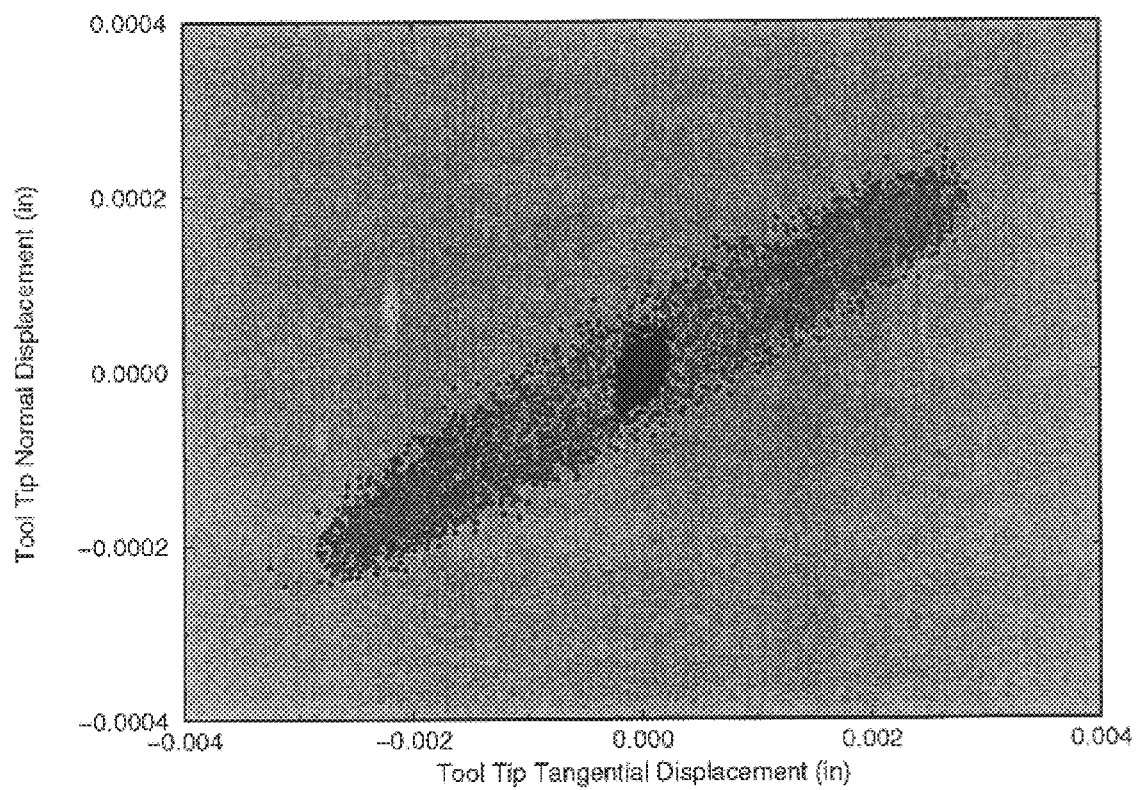
FIG. 22 is a graph of estimated tool tip displacement portrait for 5 mil depth of cut.

The workpiece speed was set to 112 rpm and the feed was set to 0.006 inches/revolution. With the active vibration control on and off, the tangential and normal tool tip accelerations were monitored for 10 second intervals. With active vibration control off, the power spectra shown in FIGS. 20 and 21 indicate that heavy vibration was sustained near the resonant frequency of 330 hz. Active vibration control reduced the vibrational energy by two orders of magnitude, although a strong resonant vibration persisted. The tool tip displacements were estimated through a broad band frequency domain integration of the acceleration signals. The resulting tangential-normal displacement portrait given in FIG. 22 reveals the dominant nature of the tangential vibration, with an amplitude 10 times greater than the normal vibration. Thus, suppressing the tangential vibration was critical to the success of the active vibration control. For this example, active vibration control produced a marginal improvement in surface finish from 83 to 53 inches.

Depth of Cut 0.010 Inches

Figure 23:
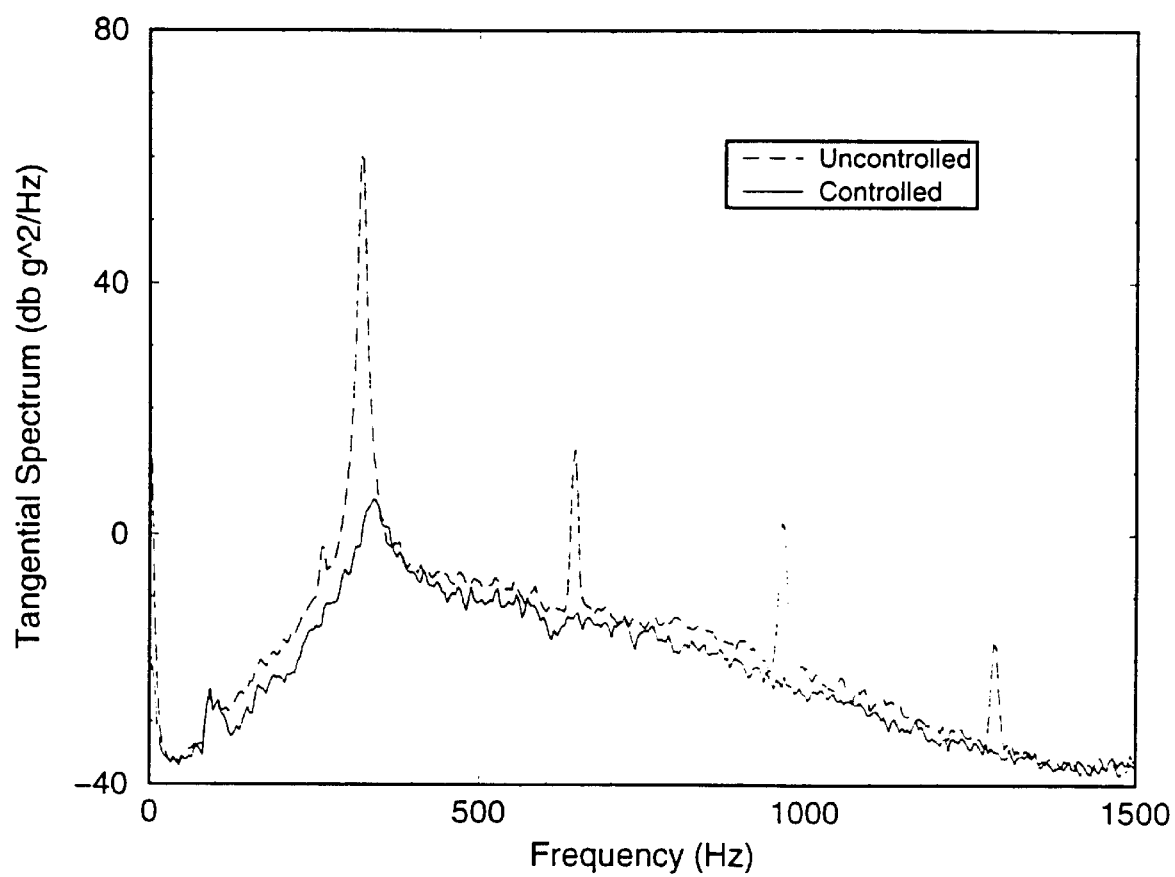
FIG. 23 is a graph of tangential acceleration spectrum for 10 mil depth of cut.
Figure 24:
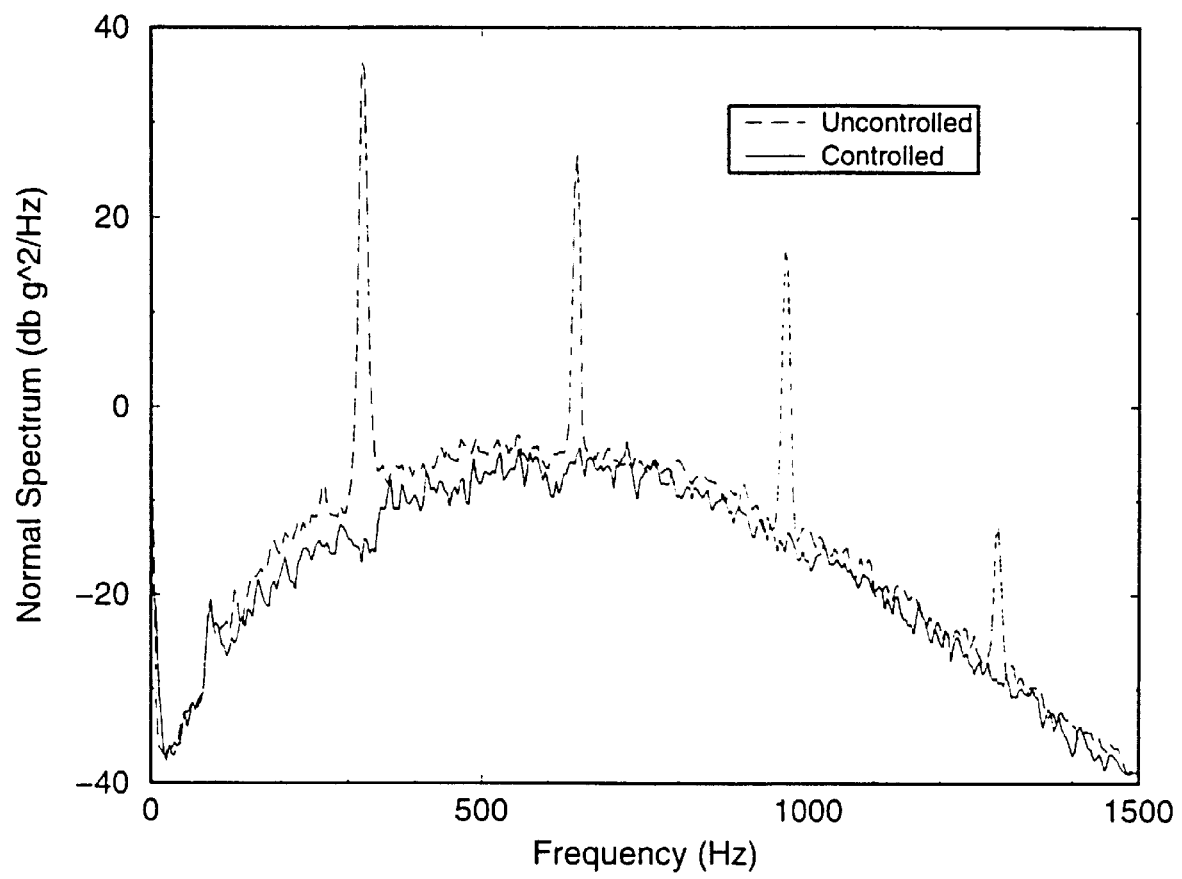
FIG. 24 is a graph of normal acceleration spectrum for 10 mil depth of cut.
Figure 25:
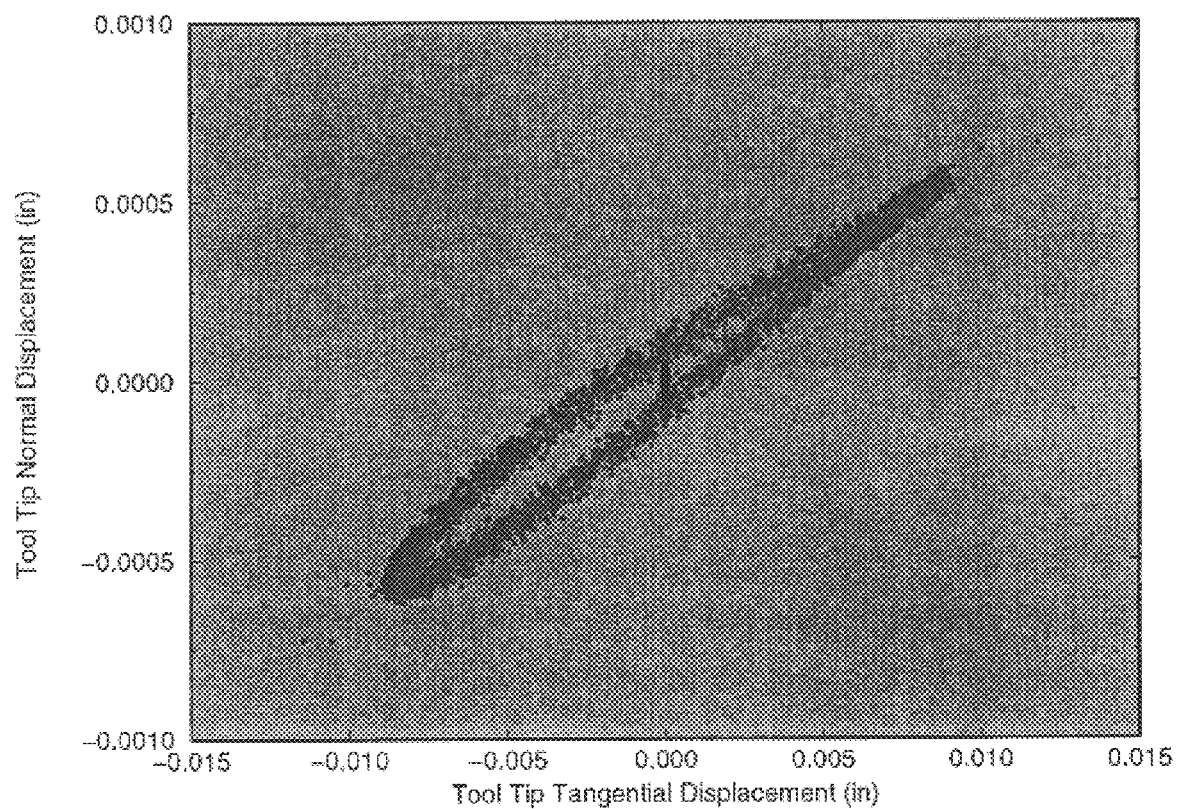
FIG. 25 is a graph of estimated tool tip displacement portrait for 10 mil depth of cut.

With the cut depth set at 0.010 inches and the active vibration control off, the cutting speed and feed rate were adjusted until a heavy chatter was sustained at 127 rpm and 0.0045 inches/revolution. Acceleration measurements were recorded for 10 seconds prior to activating the active vibration control, after which 10 more seconds of data were recorded. Power spectra for these conditions are shown in FIGS. 23 and 24. While the existence of the strong resonant peak and several harmonics for the uncontrolled case give strong evidence that the bar was chattering, the elimination of the peaks with the active vibration control on indicate that the chatter was completely eliminated. The vibrational energy at the resonant peak for this case was reduced by nearly 60 db. Consequently the estimated displacement portrait given in FIG. 25 shows a that the tool tip displacements were dramatically reduced. Overall, the surface finish improved from 140 μinches for the uncontrolled case to 54 μinches in the presence of active vibration control.

Figure 26:
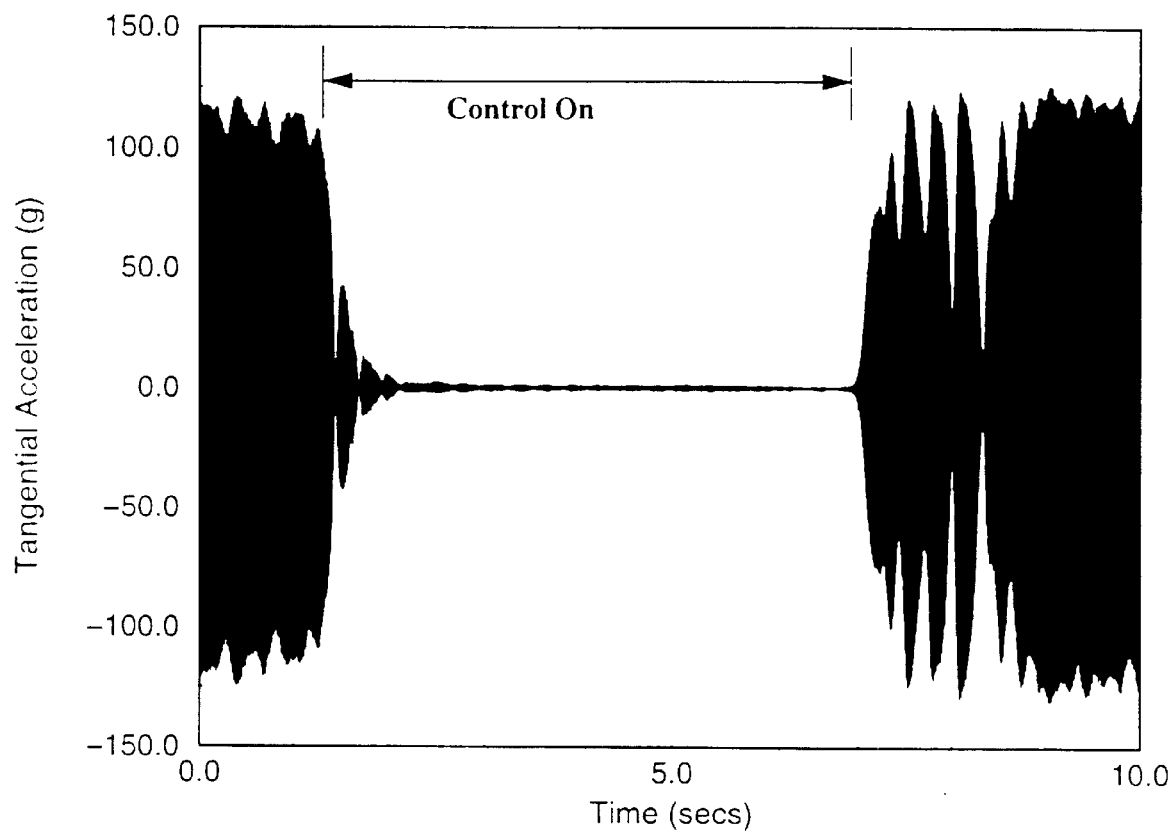
FIG. 26 is an example of off-on control transition for 10 mil depth of cut.

The transition between chatter and no chatter machining offered interesting insight into the interaction of the control with the nonlinear metal cutting process. To illustrate, a 10 second clip of the tangential acceleration history is shown in FIG. 26. Heavy chatter is evident in the data prior to activation of the control system at approximately 1.5 seconds. After activation, a short transition period is evident during which the tool worked to overcome the forced vibration caused by the previously recorded chatter marks on the workpiece surface. By 2.5 seconds, the chatter was eliminated and stable machining occurred until the controller was shut down at 7 seconds. Again a transition period existed, during which the chatter slowly grew, covering more of the workpiece surface with each revolution. By nine seconds, the chatter covered the entire circumference of the workpiece, and was sustained at a high level until the cut was terminated.

Depth of Cut 0.015 Inches

Figure 27:
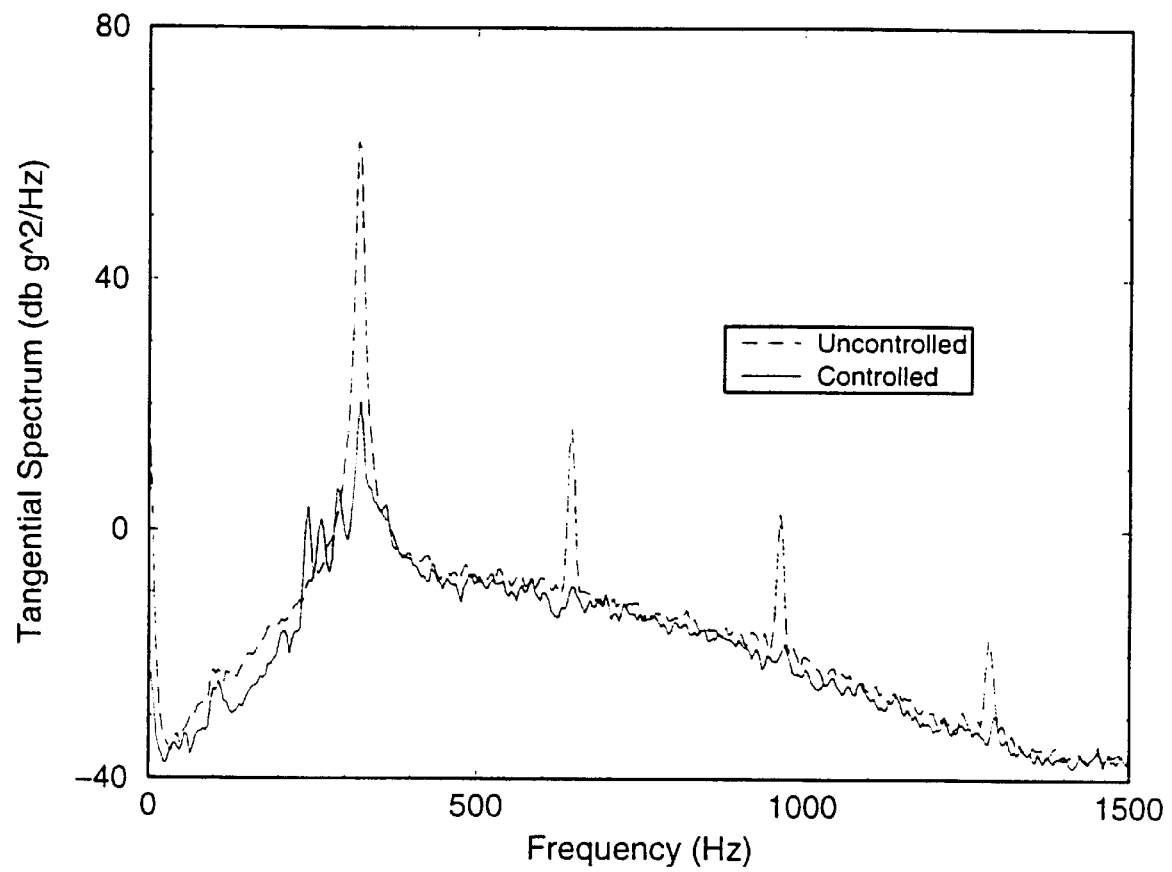
FIG. 27 is a graph of tangential acceleration spectrum for 15 mil depth of cut.
Figure 28:
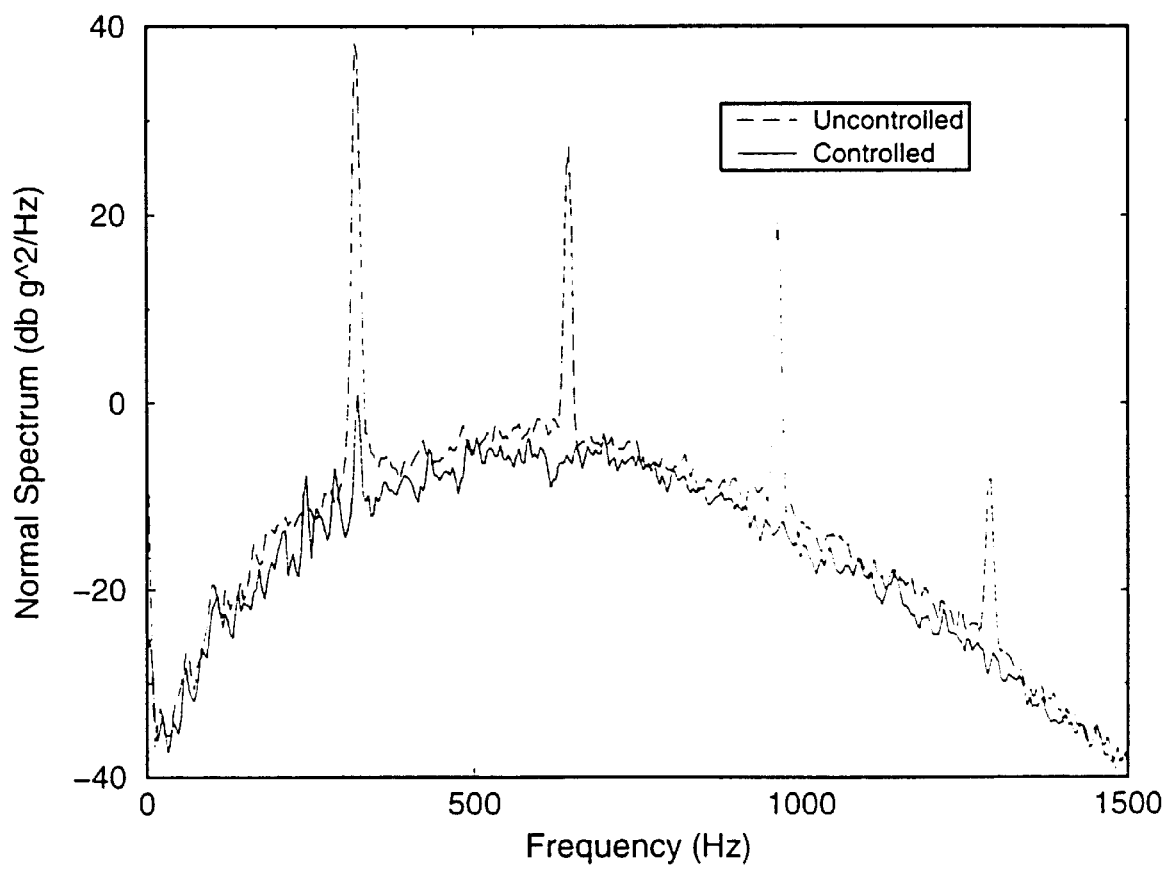
FIG. 28 is a graph of normal acceleration spectrum for 15 mil depth of cut.
Figure 29:
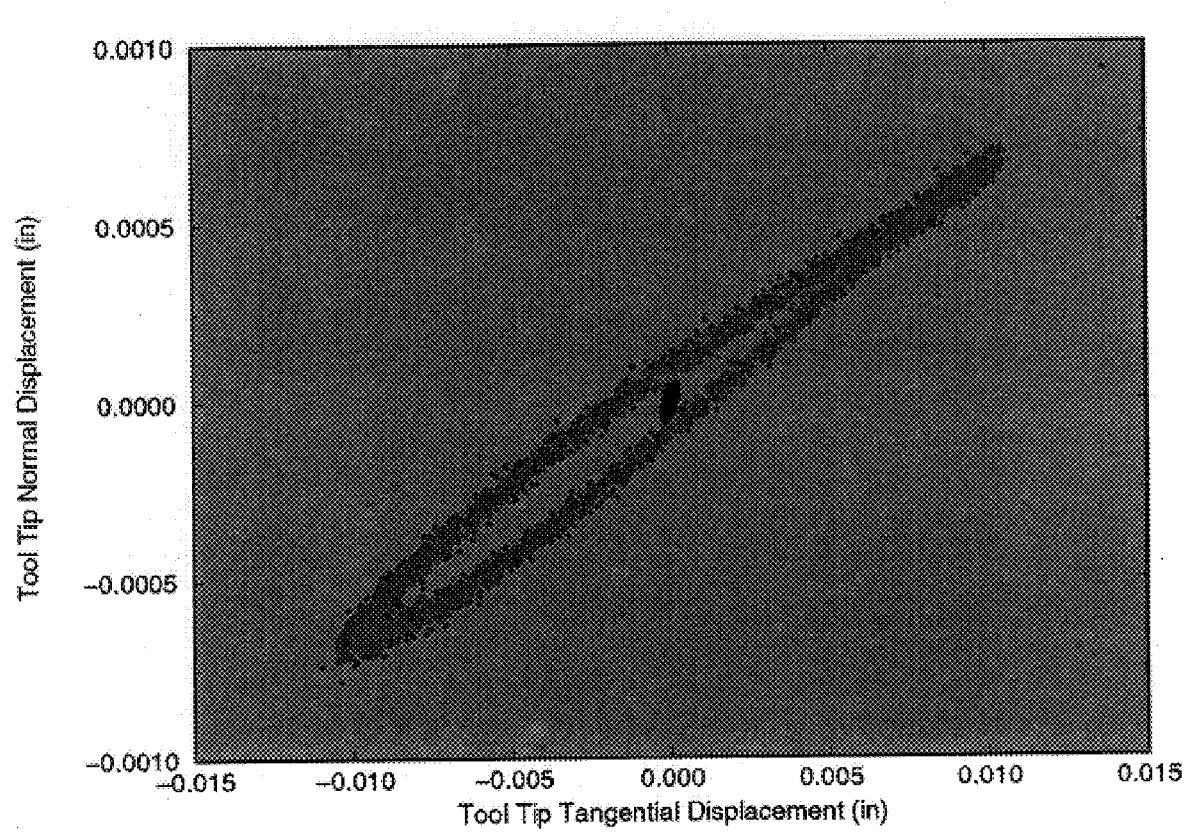
FIG. 29 is a graph of estimated tool tip displacement portrait for 15 mil depth of cut.

Power spectra for the case of 0.015 inch depth of cut at 160 rpm with feed rate of 0.006 inches/rev are shown in FIGS. 27 and 28. Again the uncontrolled case shows strong evidence for the presence of chatter. Although a small resonant peak remained after the application of active vibration control, the lack of harmonic peaks was indicative of a steady vibration not building to chatter. This is verified by the tool tip displacement portrait given in FIG. 29. For this example surface roughness was reduced from 120 to 60 μinches.

Depth of Cut 0.020 Inches

Figure 30:
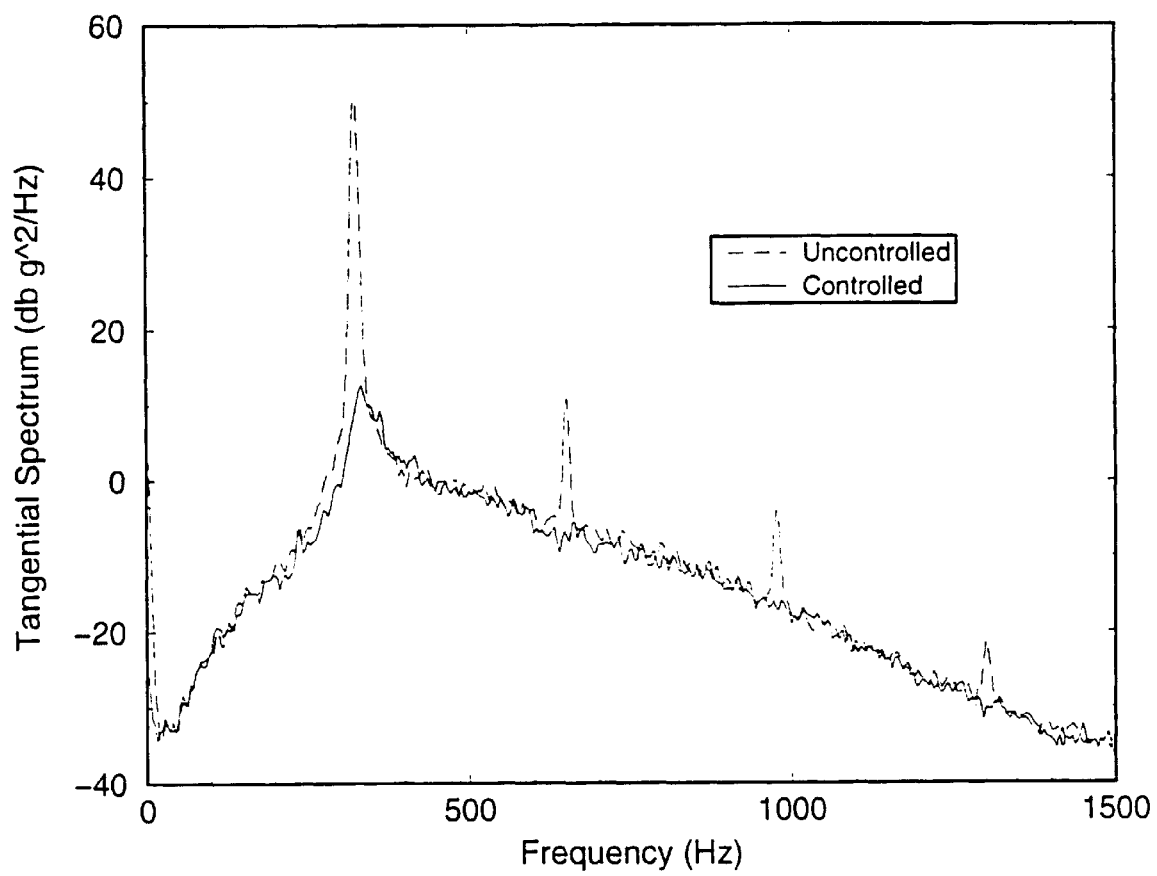
FIG. 30 is a graph of tangential acceleration spectrum for 20 mil depth of cut.
Figure 31:
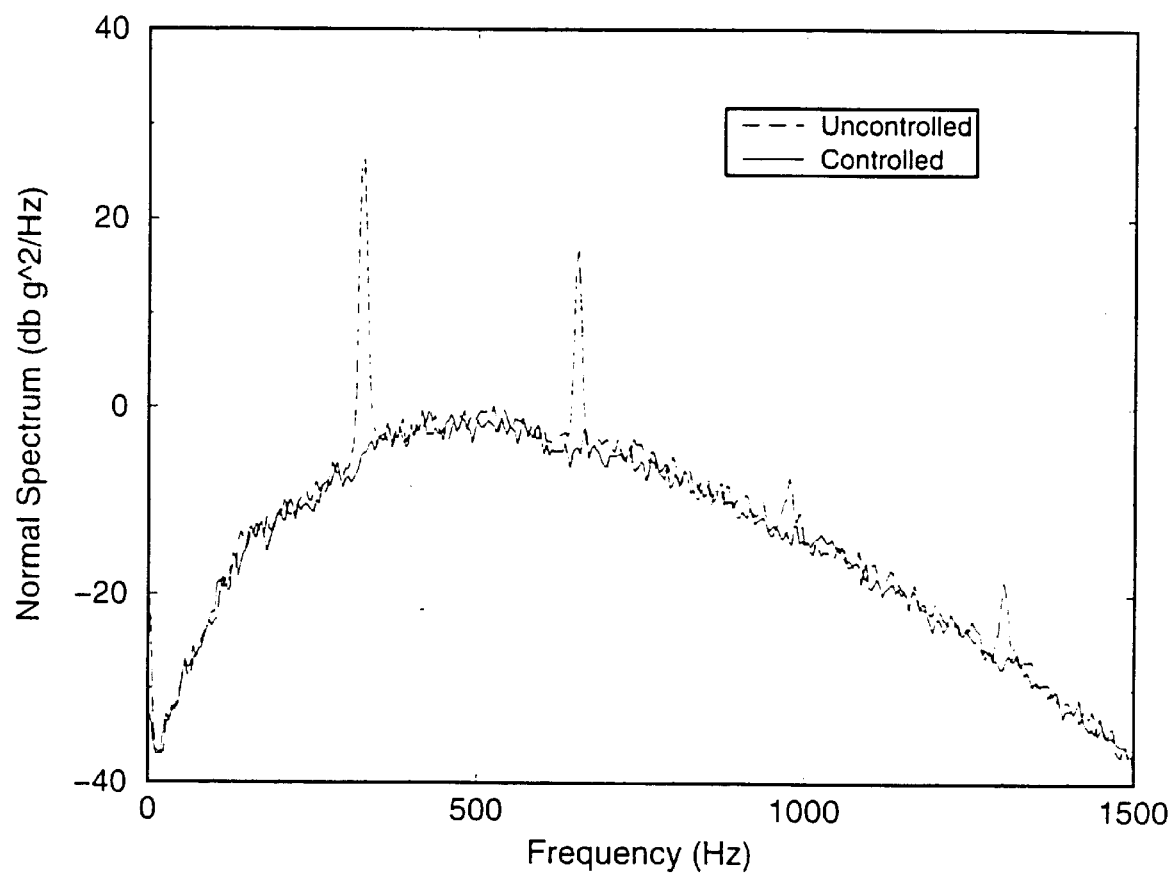
FIG. 31 is a graph of normal acceleration spectrum for 20 mil depth of cut.
Figure 32:
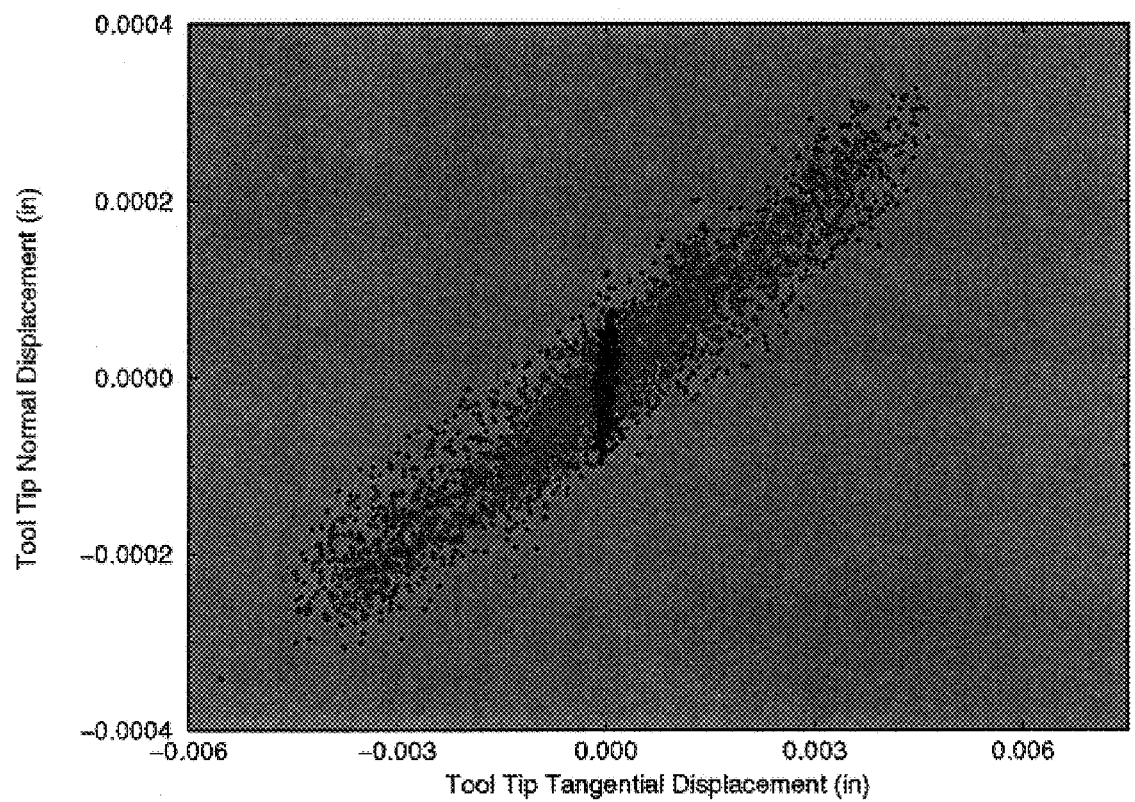
FIG. 32 is a graph of estimated tool tip displacement portrait for 20 mil depth of cut.

As shown in FIGS. 30 and 31, sustainable chatter for a 0.02 inch cut depth was established with a workpiece speed of 79 rpm and feed rate of 0.003 inches/rev. The chatter was again eliminated upon activation of the active vibration control, although the resonant peak dominates the residual vibration. The surface roughness for this example was reduced from 167 μinches to 85 μinches, owing to the reduced tool tip vibration amplitude shown in FIG. 32.

Performance Assessment

In the previous section, a number of sample cuts were examined to demonstrate the effectiveness of the actively damped boring bar in eliminating chatter. However, these examples provided little insight into the overall performance enhancement resulting from active vibration control. As previously mentioned, in many cases active vibration control can prevent chatter from occurring even when it is ineffective at removing chatter once it is sustained due to the stroke limitations of the actuators. Thus, it is necessary to scope out the chatter prevention capabilities of the actively controlled bar and compare them to a standard bar with no modifications.

Toward that end, a test matrix was contrived to explore vibration amplitude as a function of speed and feed for both the actively controlled bar and a pristine bar of identical make and model. With the depth of cut fixed at 0.015 inches, the workpiece speed was varied from 75 to 180 rpm in 10 increments and the feed rate was swept from 0.0015 inches to 0.0195 inches in 13 increments. At each point on the test matrix, ten seconds of normal and tangential tool tip accelerations were recorded after a steady state vibration level was achieved.

FIGS. 33–36 contain approximate rms tool-tip displacements for the test matrix. Displacements were obtained from a narrow band integration of the raw acceleration data taken at the fundamental frequency. While this approach produces reasonably accurate results in the presence of chatter vibrations, significant magnitude errors can occur for low level vibrations that are not dominated by a signal frequency. This discrepancy is verified by comparing results of the test matrix to the broad band integration used on the individual cutting examples of the previous section. For this series of tests, however, narrow band integration was favored because it enabled rapid progression through the test matrix without overly burdening the storage capacity of the data aquisition system. Consequently, while results may not accurately reflect the magnitude of the lower level vibrations, the plots give a clear indication of the border between the stable and unstable regions.

Figure 33:
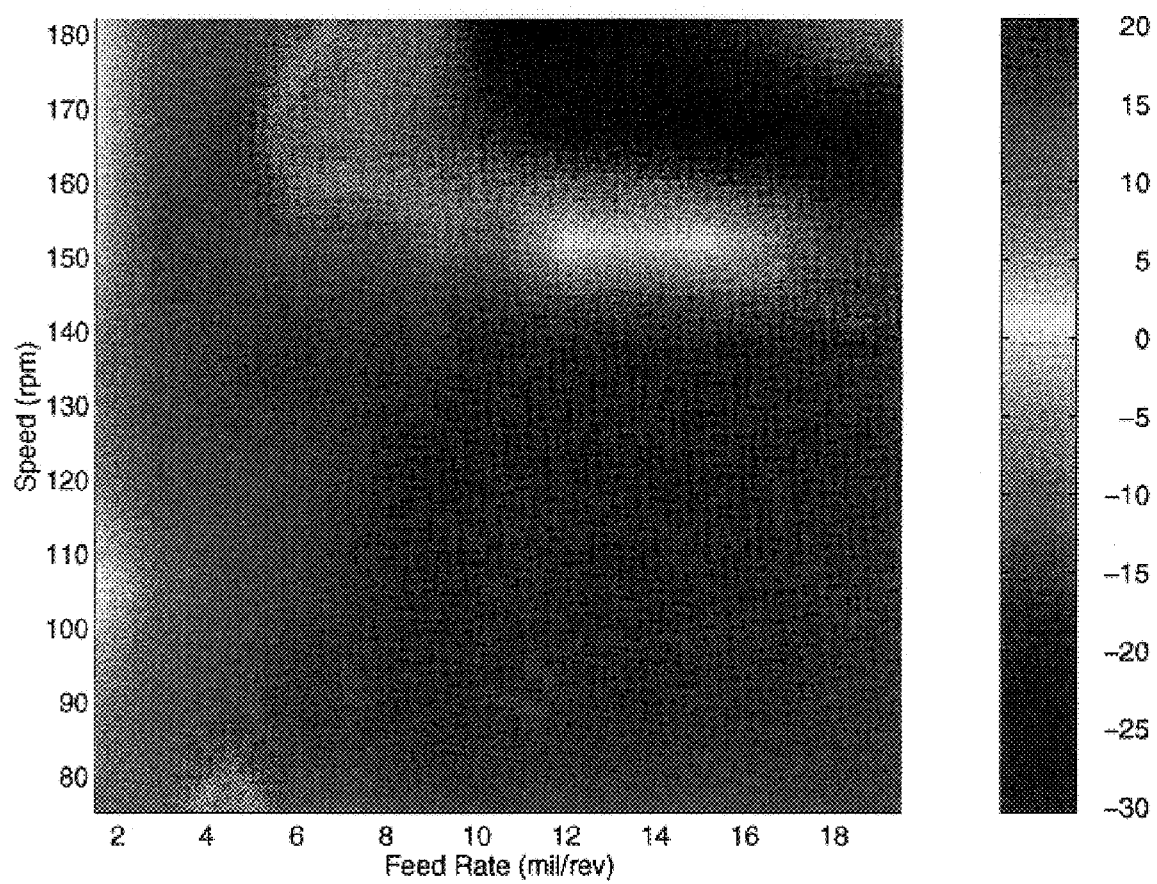
FIG. 33 is a plot of estimated tangential vibration amplitude contours.
Figure 34:
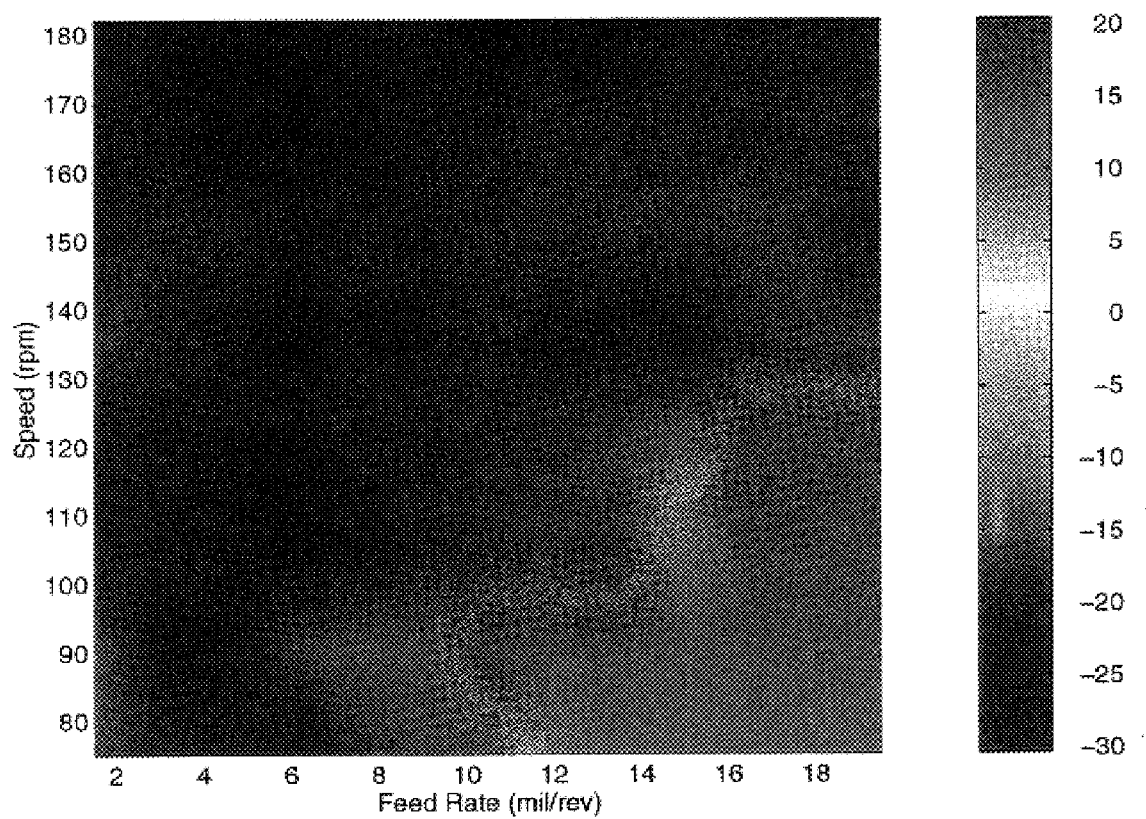
FIG. 34 is a plot of estimated tangential vibration amplitude contours.
Figure 35:
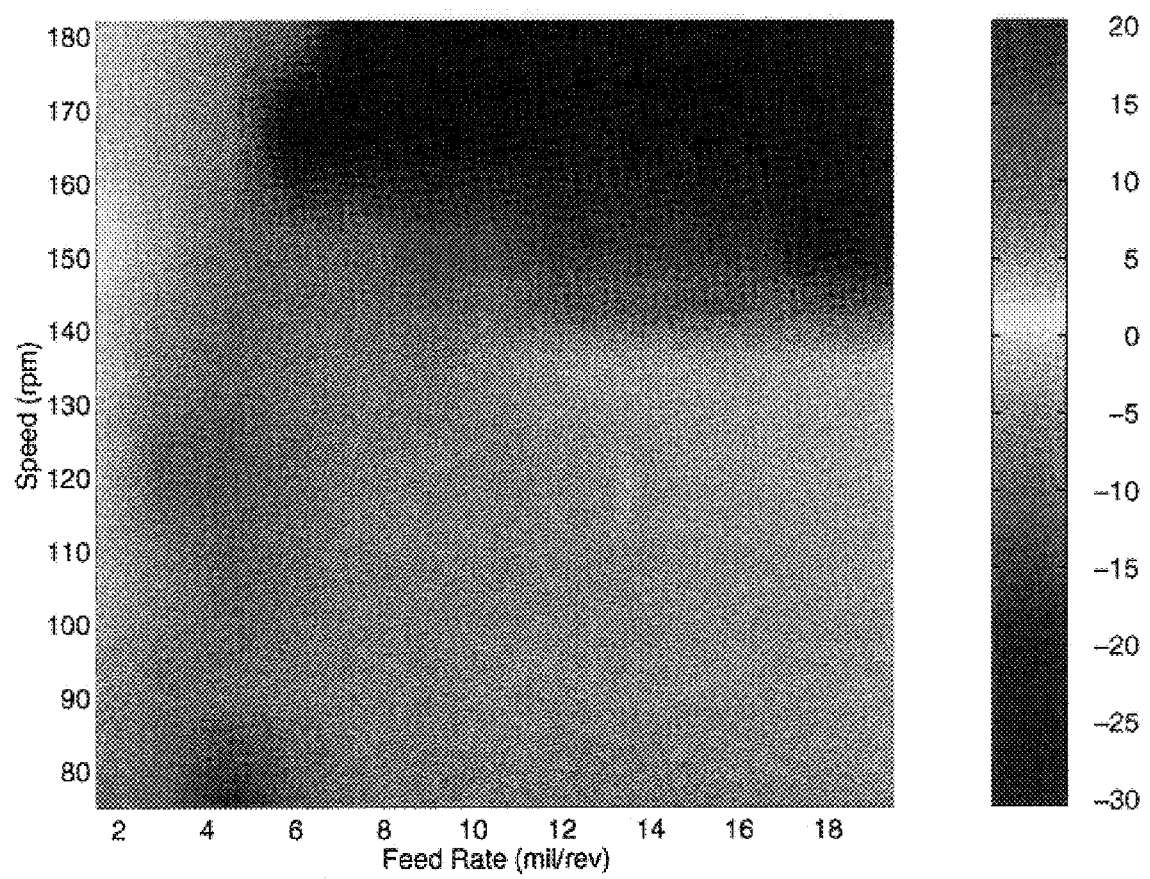
FIG. 35 is a plot of estimated normal vibration amplitude contours.
Figure 36:
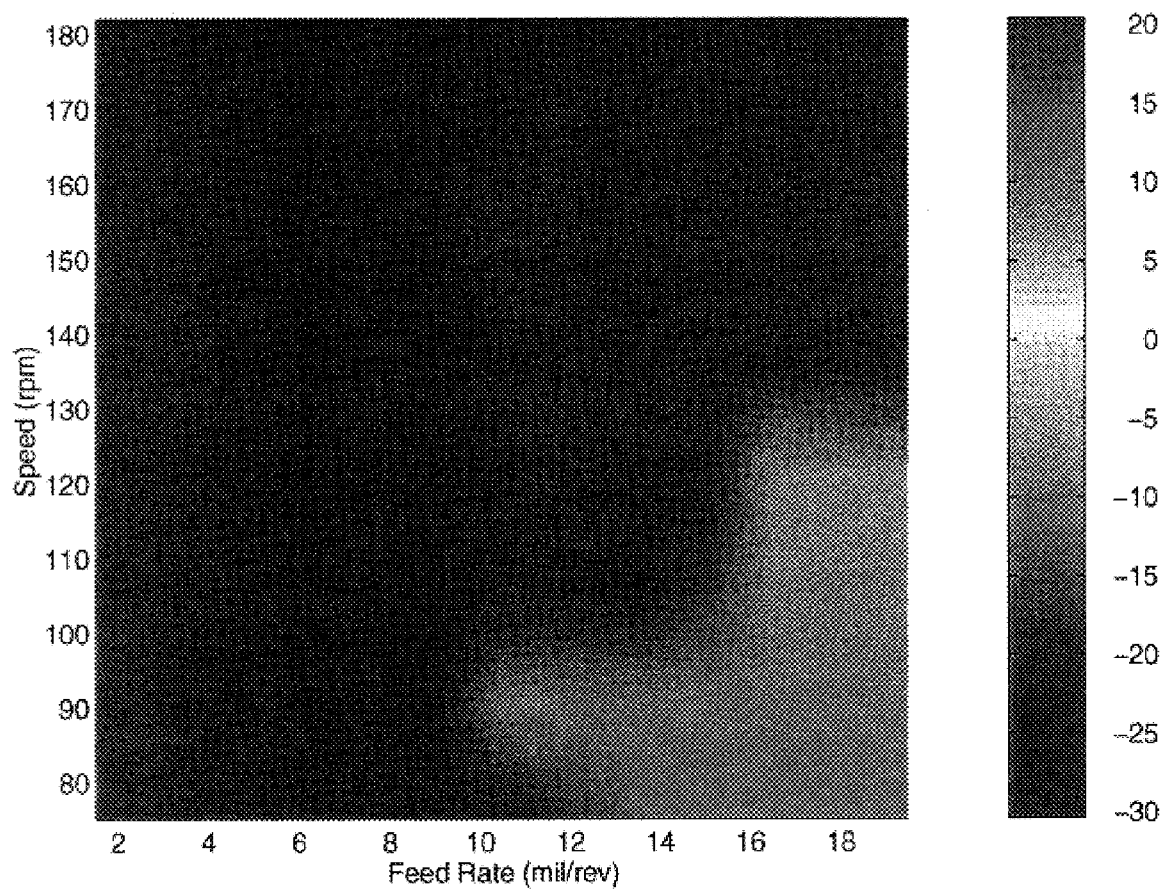
FIG. 36 is a plot of estimated normal vibration amplitude contours.

For the unmodified bar shown in FIGS. 33 and 35, chatter vibrations dominated the test matrix with the tangential and normal vibrations amplitudes on the order of 0.010 and 0.001 inches, respectively. Although a small region of chatter free machining was encountered at the highest speeds and feed rates, these conditions are characterized by poor surface finishes. In contrast to the unmodified bar, the bar with active vibration control yielded greatly reduced vibration levels over most of the parameter space considered as shown in FIGS. 34 and 36. Only the lowest speeds with the highest feed rates produced appreciable vibration levels. Thus, for the conditions considered, the modified bar drastically outperformed the unmodified bar and enabled the production of workpieces with acceptable surface finishes.

The particular sizes and equipment discussed above are cited merely to illustrate particular embodiments of the invention. It is contemplated that the use of the invention may involve components having different sizes and characteristics. It is intended that the scope of the invention be defined by the claims appended hereto.

We claim:

1. A method for damping vibration in a structure, comprising:
   a) sensing a first force acting on the structure;
   b) mounting at least one actuator with the structure so that activation of the actuator produces a second force acting on the structure, wherein said actuator has first and second ends, and wherein said first end is mounted with a first portion of said structure, and wherein said second end is mounted with a second portion of said structure, and wherein said first portion and said second portion are rigidly connected;
   c) activating the actuator to produce the second force that counters vibration due to the first force.

2. The method of claim 1, wherein the step of mounting at least one actuator comprises mounting a plurality of actuators.

3. A method for damping vibration in a structure, comprising:
   a) sensing a first force acting on the structure;
   b) mounting a plurality of actuators with the structure so that activation of the actuators produces a second force acting on the structure, wherein the step of mounting a plurality of actuators comprises mounting a first actuator at a first angle to an axis of the structure, and a second actuator at a second angle to said axis, where the second angle is different than the first angle;
   c) activating the actuator to produce the second force that counters vibration due to the first force.

4. The method of claim 3, wherein the step of mounting a plurality of actuators comprises mounting at least one actuator selected from the group consisting of: PZT stack actuators, magnetostrictive actuator, electrostrictive actuator, and hydraulic actuator.

5. The method of claim 3, wherein said first actuator has first and second ends, and wherein the step of mounting a plurality of actuators comprises mounting said first and second ends with the structure so that force but not moments are transmitted therebetween.

6. The method of claim 3, wherein the step of sensing a first force applied to the structure comprises sensing displacement of a portion of the structure.

7. The method of claim 3, wherein the step of sensing a force applied to the structure comprises sensing velocity of a portion of the structure.

8. The method of claim 3, wherein the step of sensing a force applied to the structure comprises sensing acceleration of a portion of the structure.

9. A method for damping vibration in a structure, comprising:
   a) sensing a first force acting on the structure;
   b) mounting at least one actuator with the structure so that activation of the actuator produces a second force acting on the structure;
   c) activating the actuator to produce the second force that counters vibration due to the first force; wherein the step of mounting at least one actuator comprises mounting a first PZT stack actuator at a first azimuthal angle, and a second PZT stack actuator at a second azimuthal angle substantially orthogonal to the first azimuthal angle, and wherein the step of sensing a force acting on the structure comprises sensing acceleration of a portion of the structure.

10. A machine tool support, comprising:
    a) a rigid bar, having a root end and a cutting end, and a recess formed near the root end; and
    b) an actuator having first and second ends, said first and said second end mounted with said bar in said recess.

11. A machine tool support, comprising:
    a) a bar, having a root end and a cutting end, wherein said bar has a recess formed near the root end; and
    b) actuation means comprising an actuator mounted with said recess for generating a first force acting on the bar responsive to a second force acting on the bar resulting from a machining operation;
    wherein said recess has concave ends, and wherein said actuator has rounded fittings adapted to mount with said concave ends.

12. A machine tool support, comprising:
    a) a bar, having a root end and a cutting end;
    b) actuation means for generating a first force acting on the bar responsive to a second force acting on the bar resulting from a machining operation, wherein said bar has first and second recesses formed near the root end, wherein said first and second recesses are substantially 90 degrees separated in azimuth, and wherein said actuation means comprises at least one actuator mounted with each of said first and second recesses.

13. The machine tool support of claim 12, wherein said actuation means comprises means for activating said actuator.

14. The machine tool support of claim 13, wherein said actuation means comprises means for determining a force required from said actuator.

15. The machine tool support of claim 12, wherein said actuator is selected from the group consisting of: PZT stack actuator, magnetostrictive actuator, electrostrictive actuator, and hydraulic actuator.

16. An actively damped boring bar, comprising:

a) a bar, having a root end and a cutting end; and b) first and second actuators mounted with said bar at different azimuthal angles relative thereto;

c) control means for determining a force required from said actuators; and d) activation means for activating said actuators responsive to the control means.

17. The bar of claim 16, wherein said control means comprises an accelerometer mounted with said bar, and wherein said actuators are mounted in recesses formed near the root end of said bar.

* * * * *